US008817690B2

(12) United States Patent
Huang et al.

(10) Patent No.: US 8,817,690 B2
(45) Date of Patent: Aug. 26, 2014

(54) METHOD AND APPARATUS FOR SCHEDULING NETWORK TRAFFIC IN THE PRESENCE OF RELAYS

(75) Inventors: Xiaolong Huang, San Diego, CA (US); Rajat Prakash, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 122 days.

(21) Appl. No.: 13/438,611

(22) Filed: Apr. 3, 2012

(65) Prior Publication Data
US 2012/0250603 A1  Oct. 4, 2012

Related U.S. Application Data

(60) Provisional application No. 61/471,609, filed on Apr. 4, 2011.

(51) Int. Cl.
| | |
|---|---|
| *H04J 3/08* | (2006.01) |
| *H04W 72/04* | (2009.01) |
| *H04W 72/12* | (2009.01) |
| *H04W 72/08* | (2009.01) |
| *H04W 84/04* | (2009.01) |

(52) U.S. Cl.
CPC ...... *H04W 72/0486* (2013.01); *H04W 72/1257* (2013.01); *H04W 72/087* (2013.01); *H04W 84/047* (2013.01)
USPC .......................................................... 370/315

(58) Field of Classification Search
CPC .................................................... H04B 7/2606
USPC ................................................. 370/311, 315
See application file for complete search history.

(56) References Cited

U.S. PATENT DOCUMENTS

| | | | |
|---|---|---|---|
| 2007/0070972 A1* | 3/2007 | Wang et al. | 370/349 |
| 2009/0168793 A1 | 7/2009 | Fox et al. | |
| 2010/0302946 A1 | 12/2010 | Yang et al. | |
| 2010/0322197 A1 | 12/2010 | Adjakple et al. | |

(Continued)

FOREIGN PATENT DOCUMENTS

| | | |
|---|---|---|
| EP | 2015524 A1 | 1/2009 |
| EP | 2244514 A1 | 10/2010 |
| WO | WO2010123256 A2 | 10/2010 |
| WO | WO 2011/038784 A1 | 4/2011 |

OTHER PUBLICATIONS

International Search Report and Written Opinion—PCT/US2012/032109—ISA/EPO—Jun. 19, 2012.

*Primary Examiner* — Hassan Kizou
*Assistant Examiner* — Abdullahi Ahmed
(74) *Attorney, Agent, or Firm* — Arent Fox LLP

(57) ABSTRACT

Methods and apparatuses are provided that include scheduling best effort (BE) traffic for devices communicating with a relay. A donor evolved Node B (eNB) schedules BE traffic for various devices based on a historical throughput. The donor eNB can determine a number of devices served by the relay for discounting the historical throughput, and accordingly assigning resources based on the number of devices instead of the single relay. In this regard, the donor eNB can maintain proportional fairness of the BE scheduling. Alternatively, the relay can request a guaranteed bit rate (GBR) bearer to handle the BE traffic, where the requested data rate of the GBR bearer allows for communicating the BE traffic for the number of devices. Resource allocation for BE traffic can also be bound by a maximum throughput at the relay and/or one or more access link data rates.

44 Claims, 15 Drawing Sheets

(56) References Cited

U.S. PATENT DOCUMENTS

| | | |
|---|---|---|
| 2011/0206094 A1 | 8/2011 | Zhang et al. |
| 2011/0244786 A1 | 10/2011 | Fujii et al. |
| 2011/0261747 A1* | 10/2011 | Wang et al. .................. 370/315 |
| 2012/0093070 A1* | 4/2012 | Huang et al. ................. 370/315 |
| 2012/0307668 A1* | 12/2012 | Wiemann et al. ............. 370/252 |
| 2013/0083714 A1* | 4/2013 | Joko et al. .................... 370/311 |
| 2013/0137416 A1* | 5/2013 | Obuchi et al. ................ 455/418 |
| 2013/0242883 A1* | 9/2013 | Kalyanasundaram et al. ............................ 370/329 |

\* cited by examiner

METHOD AND APPARATUS FOR SCHEDULING NETWORK TRAFFIC IN THE PRESENCE OF RELAYS

CLAIM OF PRIORITY UNDER 35 U.S.C. §119

The present Application for Patent claims priority to Provisional Application No. 61/471,609, entitled APPARATUS AND METHOD FOR BEST EFFORT TRAFFIC SCHEDULING WITH RELAYS, filed Apr. 4, 2011, assigned to the assignee hereof and hereby expressly incorporated by reference herein.

BACKGROUND

1. Field

The following description relates generally to wireless network communications, and more particularly to scheduling best effort traffic in networks that employ relays.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, etc.). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP) (e.g., 3GPP LTE (Long Term Evolution)/LTE-Advanced), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth.

In addition, relays can be used in some wireless communication systems to expand base station coverage, improve communication throughput, and/or the like. For example, relays can be assigned resources from a base station (much like a device), and can assign resources to a device (much like a base station). Upon receiving communications from the base station over the resources assigned by the base station, the relay can transmit the communications to one or more intended devices over resources assigned thereto by the relay, and vice versa. The relay can perform decoding/encoding of signals received before transmitting to the intended device or base station. Relays can operate in: a half duplex mode, where at any given time, the relays receive signals from a base station or transmit to a device, but typically not both; or a full duplex mode where the relay can transmit and receive at the same time (e.g., in the same frequency band).

A base station serving a relay, which can be referred to as a donor base station, schedules the relay as it would a device. For guaranteed bit rate (GBR) traffic, the relay can establish GBR bearers with the donor base station, which correspond to GBR bearers established between the relay and respective devices. For non-GBR, or best effort (BE) traffic, a single bearer is allowed with the donor base station per connection (e.g., one bearer is allowed for the relay regardless of a number of devices served). Information regarding devices served by the relay is not available at the donor base station, and thus for non-GBR or best effort traffic, a relay (and devices served by the relay) may be allocated a similar amount of resources as a device communicating with the donor base station directly, as another relay serving another number of devices, etc. This may not achieve proportional fairness among the devices for scheduling the best effort traffic.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, the present disclosure describes various aspects in connection with allowing a donor base station to maintain proportional fairness in best effort (BE) traffic scheduling where relays are employed. For example, the donor base station can determine a number of devices served by a relay for determining resource allocation for the relay. In one example, relays can indicate a count of devices served to the donor base station through various mechanisms. In another example, the donor base station can inspect packets received from the relay to determine a number of devices served by the relay (e.g., based on a subscriber identifier in the packets, etc.). In these examples, the donor base station can schedule BE resources to the relays based on the known number of devices served. In other examples, a relay can request a guaranteed bit rate (GBR) bearer from the donor base station for serving BE traffic of its served devices, and can indicate the requested bit rate according to the number of devices and/or an estimation of a proportion bit rate for the devices.

According to an example, a method for requesting best effort resource scheduling from a donor evolved Node B (eNB) is provided. The method includes transmitting an indication of a number of served user equipments (UEs) and transmitting a request for establishing a bearer for communicating best effort traffic for the served UEs based at least in part on the number of served UEs.

In another aspect, an apparatus for requesting best effort resource scheduling from a donor eNB is provided. The apparatus includes at least one processor configured to transmit an indication of a number of served UEs and transmit a request to establish a bearer for communicating best effort traffic for the served UEs based at least in part on the number of served UEs. The apparatus further includes a memory coupled to the at least one processor.

In yet another aspect, an apparatus for requesting best effort resource scheduling from a donor eNB is provided. The apparatus includes means for transmitting an indication of a number of served UEs and means for transmitting a request to establish a bearer for communicating best effort traffic for the served UEs based at least in part on the number of served UEs.

Still, in another aspect, a computer-program product for requesting best effort resource scheduling from a donor eNB is provided including a non-transitory computer-readable medium having code for causing at least one computer to transmit an indication of a number of served UEs. The computer-readable medium further includes code for causing the at least one computer to transmit a request to establish a bearer for communicating best effort traffic for the served UEs based at least in part on the number of served UEs.

Moreover, in an aspect, an apparatus for requesting best effort resource scheduling from a donor eNB is provided that includes a connection number indicating component for transmitting an indication of a number of served UEs. The apparatus further includes a bearer requesting component for transmitting a request to establish a bearer for communicating best effort traffic for the served UEs based at least in part on the number of served UEs.

According to another example, a method for requesting best effort resource scheduling from a donor eNB is provided. The method includes determining one or more parameters related to best effort traffic with a donor eNB and requesting a GBR bearer from the donor eNB specifying a data rate based on the one or more parameters and a number of served UEs.

In another aspect, an apparatus for requesting best effort resource scheduling from a donor eNB is provided. The apparatus includes at least one processor configured to determine one or more parameters related to best effort traffic with a donor eNB and request a GBR bearer from the donor eNB specifying a data rate based on the one or more parameters and a number of served UEs. The apparatus further includes a memory coupled to the at least one processor.

In yet another aspect, an apparatus for requesting best effort resource scheduling from a donor eNB is provided that includes means for determining one or more parameters related to best effort traffic with a donor eNB. The apparatus also includes means for requesting a GBR bearer from the donor eNB specifying a data rate based on the one or more parameters and a number of served UEs.

Still, in another aspect, a computer-program product for requesting best effort resource scheduling from a donor eNB is provided including a non-transitory computer-readable medium having code for causing at least one computer to determine one or more parameters related to best effort traffic with a donor eNB. The computer-readable medium further includes code for causing the at least one computer to request a GBR bearer from the donor eNB specifying a data rate based on the one or more parameters and a number of served UEs.

Moreover, in an aspect, an apparatus for requesting best effort resource scheduling from a donor eNB is provided. The apparatus includes a best effort throughput determining component for determining one or more parameters related to best effort traffic with a donor eNB and a bearer requesting component for requesting a guaranteed bit rate (GBR) bearer from the donor eNB specifying a data rate based on the one or more parameters and a number of served UEs.

In another example, a method for allocating best effort resources for one or more relay eNBs is provided. The method includes receiving a request for a best effort bearer from a relay eNB, and determining a number of UEs served by the relay eNB. The method further includes discounting a historical throughput of the relay eNB by the number of UEs and allocating resources for the best effort bearer to the relay eNB based at least in part on the discounted historical throughput.

In another aspect, an apparatus for allocating best effort resources for one or more relay eNBs is provided. The apparatus includes at least one processor configured to receive a request for a best effort bearer from a relay eNB and determine a number of UEs served by the relay eNB. The at least one processor is further configured to discount a historical throughput of the relay eNB by the number of UEs and allocate resource for the best effort bearer to the relay eNB based at least in part on the discounted historical throughput. The apparatus further includes a memory coupled to the at least one processor.

In yet another aspect, an apparatus for allocating best effort resources for one or more relay eNBs is provided that includes means for receiving a request for a best effort bearer from a relay eNB and means for determining a number of UEs served by the relay eNB. The apparatus further includes means for allocating resources for the best effort bearer to the relay eNB based at least in part on discounting a historical throughput of the relay eNB based on the number of UEs served by the relay eNB.

Still, in another aspect, a computer-program product for allocating best effort resources for one or more relay eNBs is provided including a non-transitory computer-readable medium having code for causing at least one computer to receive a request for a best effort bearer from a relay eNB and code for causing the at least one computer to determine a number of UEs served by the relay eNB. The computer-readable medium further includes code for causing the at least one computer to discount a historical throughput of the relay eNB by the number of UEs and code for causing the at least one computer to allocate the best effort bearer to the relay eNB based at least in part on the discounted historical throughput.

Moreover, in an aspect, an apparatus for allocating best effort resources for one or more relay eNBs is provided that includes a bearer establishing component for receiving a request for a best effort bearer from a relay eNB and a connection count determining component for determining a number of UEs served by the relay eNB. The apparatus further includes a best effort traffic scheduling component for allocating resources for the best effort bearer to the relay eNB based at least in part on discounting a historical throughput of the relay eNB based on the number of UEs served by the relay eNB.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
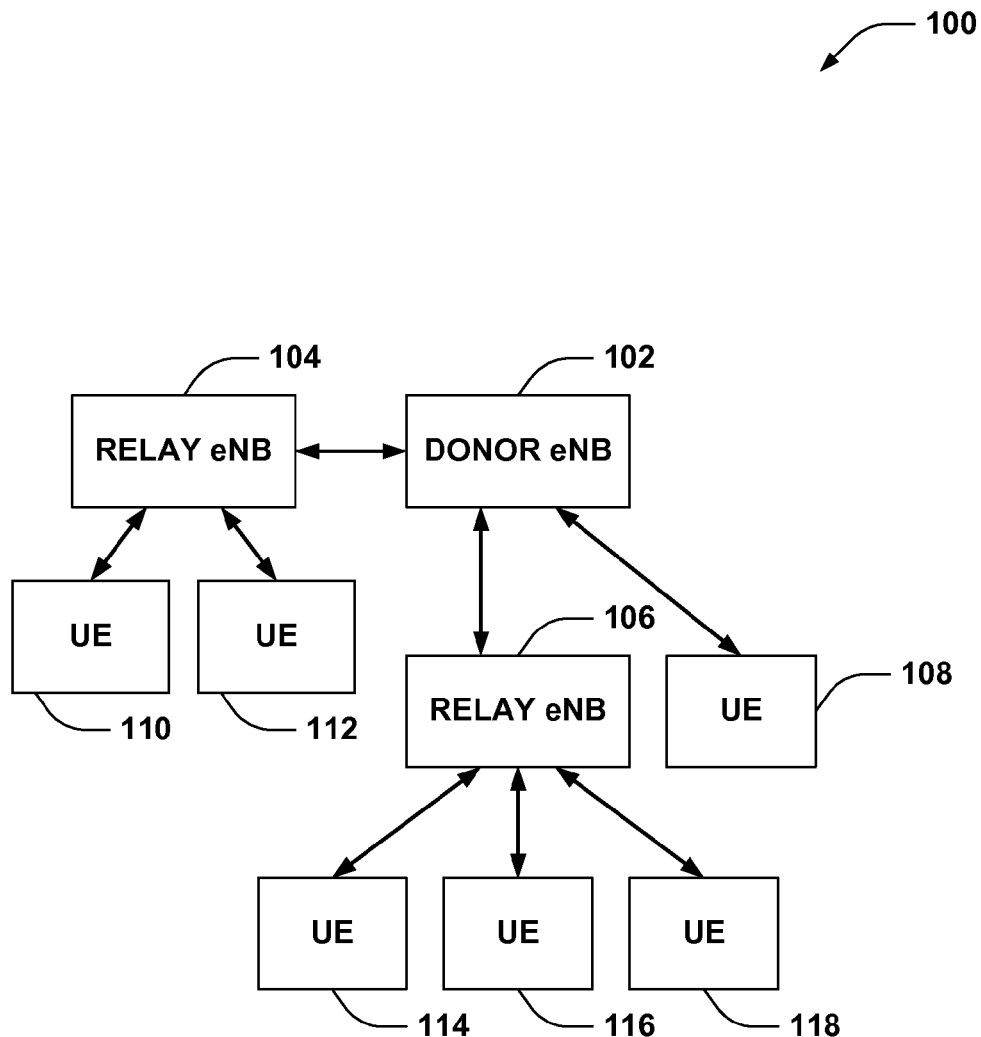
FIG. 1 is a block diagram of an aspect of a system employing a relay in wireless communications.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Described herein are various aspects related to scheduling resources to devices in a wireless network employing relays to allow proportional fairness of best effort (BE) scheduling to be maintained for the devices. In some examples, a donor base station that serves the relay can determine a number of devices that the relay serves. This can occur through indication from the relay (e.g., using explicit signaling, using a quality-of-service (QoS) class indicator (QCI) to indicate some level of the count, such as an actual count, a range, etc., indicating the count using an operations, administration, and maintenance (OAM) function, and/or the like), for example. In other examples, the donor base station can otherwise determine the count (e.g., by inspecting packets from the relay to determine a number of different device identifiers in the packets). In either case, the donor base station can utilize the number of devices for allocating resources to each relay it serves to maintain proportional fairness in scheduling BE traffic among the relays and devices communicating therewith.

In other examples, the relay can request guaranteed bit rate (GBR) bearer assignment from the donor base station for its BE traffic to ensure a fair distribution of resources. In this example, the relay can request an initial GBR bearer for its BE bearers with one or more devices, probe the BE bearers to determine throughput, and accordingly set a final requested throughput for the GBR bearer to handle the BE bearers. Moreover, in some examples, the relay can provide information regarding backhaul throughput and/or one or more access link data rates to the donor base station, which can also be used to determine resource allocation for devices served by the relay. In any case, proportionally fair scheduling for BE traffic is achieved for devices where relays are employed in the wireless network.

As used in this application, the terms "component," "module," "system" and the like are intended to include a computer-related entity, such as but not limited to hardware, firmware, a combination of hardware and software, software, or software in execution, etc. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, mobile terminal, terminal, communication device, user agent, user device, or user equipment (UE), etc. A wireless terminal may be a cellular telephone, a smart phone, a satellite phone, a cordless telephone, a Session Initiation Protocol (SIP) phone, a wireless local loop (WLL) station, a personal digital assistant (PDA), a handheld device having wireless connection capability, a computing device, a tablet, a smart book, a netbook, or other processing devices connected to a wireless modem, etc. Moreover, various aspects are described herein in connection with a base station. A base station may be utilized for communicating with wireless terminal(s) and may also be referred to as an access point, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE/LTE-Advanced and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, a wireless communication system 100 is illustrated that facilitates utilizing relay eNBs to expand coverage of a donor eNB. System 100 can include a donor eNB 102 that can provide wireless network access to one or more relay eNBs, such as relay eNBs 104 and 106, UEs, such as UE 108, and/or the like. Relay eNBs 104 and 106, and UE 108, can acquire resources from donor eNB 102 for communicating therewith. In addition, UEs 110 and 112 are served by relay eNB 104 for accessing donor eNB 102, by similarly acquiring resources from relay eNB 104. UEs 114, 116, and 118 can also receive wireless network access from relay eNB 106 by similarly requesting resources therefrom. Donor eNB 102 can be substantially any access point, such as a macrocell, femtocell, picocell, or similar base station, a mobile base station, a Wi-Fi hotspot, a portion thereof, and/or the like, that communicates with one or more core wireless network components. Relay eNBs 104 and 106 can each be mobile or stationary relay eNBs that are wired or wirelessly coupled to donor eNB 102, for example, a UE (e.g., communicating in peer-to-peer or ad-hoc mode with UEs 110, 112, 114, 116, and 118, etc.), and/or the like. UEs 110, 112, 114, 116, and 118 can each be a mobile device, modem (or other tethered device), a portion thereof, and/or the like.

In an example, relay eNBs 104 and 106 can communicate with donor eNB 102 (e.g., and/or with one another) over a wired or wireless backhaul link. In addition, relay eNBs 104 and 106 can communicate with respective UEs 110, 112, 114, 116, and 118 over wireless (or wired) access links. The relay eNBs 104 and 106 can be half duplex relays such that the relay eNBs 104 and 106 receive signals from donor eNB 102 in one time interval, and retransmit the communications in another time interval where at any given time interval, the relay eNBs 104 and 106 are transmitting or receiving, but not both. Thus, for a half duplex relay, at a given point in time, only the backhaul link or the access link is active. In another example, the relay eNBs 104 and 106 can be full duplex, such that the relay eNBs 104 and 106 can receive signals from donor eNB 102 and retransmit the signals or other signals in the same time interval. Thus, for full duplex relays, both the backhaul link and access links can be active at the same time.

According to an example, relay eNBs 104 and 106, and UE 108, can request resources from donor eNB 102 corresponding to BE traffic and/or GBR traffic (also referred to as QoS traffic). For example, relay eNBs 104 and 106 can request resources based on requests received from UEs 110, 112, 114, 116, and 118, respectively. In this regard, donor eNB 102 can schedule BE traffic using resources left after granting GBR traffic; in another example, donor eNB 102 can reserve a portion of resources for BE traffic (also referred to as non-GBR). In either case, donor eNB 102 can schedule BE traffic according to one or more algorithms that ensure proportional fairness to UEs among the resources provided.

For example, the donor eNB 102 can provide a portion of the resources that allow UEs to achieve similar data rates over a period of time. In one example, the portion of resources can vary given channel conditions of a specific UE. Since relay eNBs 104 and 106 may appear as one UE to donor eNB 102, however, resources provided to the relay eNBs 104 and 106 may have previously been proportional among relay eNB 104, relay eNB 106, UE 108, and other UEs communicating with donor eNB 102. Various mechanisms are described herein for achieving an allocation of resources more closely aligned to proportional fairness among the UEs 108, 110, 112, 114, 116, and 118.

Thus, in one example, donor eNB 102 can determine a number of UEs served by a given relay eNB, and can compute a resource allocation for BE traffic at the given relay based on the number of UEs. In one example, relay eNBs 104 and 106, or one or more other network nodes, can inform donor eNB 102 of the number of UEs communicating therewith. For example, this can include an indication in explicit signaling to the donor eNB 102, indicating the number or a representation thereof using one or more existing parameters, such as a QCI, indicating the number to an OAM from which the donor eNB 102 can obtain the number, and/or the like. In another example, donor eNB 102 can determine the number of UEs served by a relay eNB using packet inspection to count a number of different subscription identifiers or other identifiers received in the packets. In any case, for example, where donor eNB 102 utilizes a scheduling algorithm that schedules BE resources based on historic throughput, donor eNB 102 can utilize the number of UEs to discount the historic throughput for the corresponding relay eNB 104 and/or 106. Thus, no changes are required for the scheduling algorithm.

Moreover, for example, relay eNBs 104 and 106 can request GBR bearers for BE traffic of respective UEs 110 and 112, or UEs 114, 116, and 118. In this regard, relay eNB 104, for example, can compute a fair proportion of BE resources for assigning to each of the UEs 110 and 112, and can request a GBR bearer with donor eNB 102 that provides the fair proportion of resources. Thus, in this example, in an initial state, relay eNB 104 can use a non-GBR bearer with donor eNB 102 to serve a non-GBR bearer with one of UEs 110 or 112, and can monitor the bearer to determine a data rate of the proportionally fair resource allocation. Using this data rate, for example, relay eNB 104 can accordingly request a GBR from donor eNB 102 at a rate of the determined proportionally fair data rate multiplied by the number of UEs (e.g., 2 in this example). Furthermore, the data rate for the requested GBR can be modified in one or more states to account for throughput reduction caused by the requested GBR.

Figure 2:
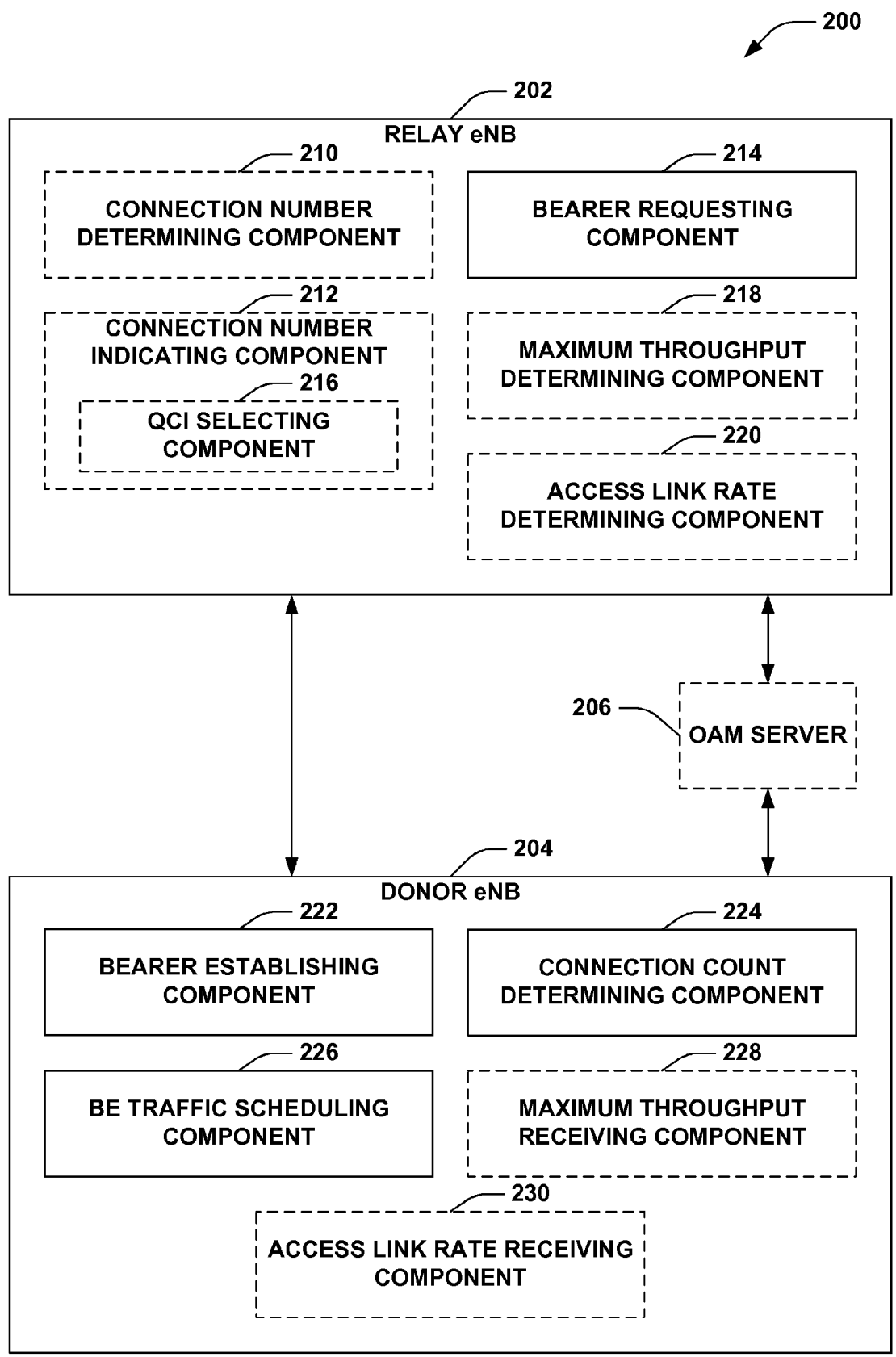
FIG. 2 is a block diagram of an aspect of a system for determining a number of user equipment (UE) served by a relay in assigning resources thereto.

Turning now to FIG. 2, an example wireless communication system 200 that facilitates allocating BE resources for UEs communicating with a relay is illustrated. System 200 can include a relay eNB 202 that can be served by a donor eNB 204 for providing wireless network access to one or more UEs or other devices (not shown), as described. In addition, system 200 can optionally include an operation, administration, and management (OAM) server 206 that communicates one or more configuration parameters to/from relay eNB 202 and donor eNB 204, respectively. For example, relay eNB 202 can be substantially any relay, such as a wired or wireless relay, a UE, etc., and donor eNB 204 can be substantially any access point, as described. Moreover, though only one OAM server 206 is optionally shown, it is to be appreciated that additional OAM servers or other core network components can be present to facilitate communicating information between relay eNB 202 and donor eNB 204 described below, in one example.

Relay eNB 202 can comprise an optional connection number determining component 210 for obtaining a number of UEs communicating with relay eNB 202 (or a number of related connections), an optional connection number indicating component 212 for specifying the number of UEs to one or more nodes, and a bearer requesting component 214 for establishing one or more bearers with another eNB for providing wireless network access to the number of UEs. Connection number indicating component 212 can optionally include a QoS class identifier (QCI) selecting component 216 for selecting a QCI to indicate in a bearer establishment request based on the number of UEs. Moreover, relay eNB 202 can include an optional maximum throughput determining component 218 for additionally indicating a maximum throughput at the relay eNB 202, and/or an optional access link rate determining component 220 for obtaining and reporting an access link rate for receiving a resource allocation from a donor eNB.

Donor eNB 204 can comprise a bearer establishing component 222 for establishing one or more bearers with a relay eNB, UE, etc. for communicating in a wireless network, a connection count determining component 224 for obtaining a number of connections at the relay eNB, and a BE traffic scheduling component 226 for discerning a number of resources to assign for BE traffic based on the number of connections at the relay eNB. Donor eNB 204 also optionally includes a maximum throughput receiving component 228 for obtaining a maximum throughput at the relay eNB, and/or an access link rate receiving component 230 for obtaining an access link rate from the relay eNB for use in determining a resource allocation for the relay eNB.

According to an example, bearer requesting component 214 can request bearer establishment with donor eNB 204 for one or more UEs communicating with relay eNB 202, as described. Bearer establishing component 222 can receive the request for a BE bearer establishment from the relay eNB 202. For example, this can include communication of one or more radio resource control (RRC) messages (e.g., RRCConnectionEstablishment, RRCConnectionReconfiguration, etc.). Connection count determining component 224 can obtain a number of UEs or related connections at relay eNB 202, and BE traffic scheduling component 226 can allocate resources for the BE bearer based on the number of UEs or related connections. Bearer establishing component 222 can establish the bearer with relay eNB 202, and accordingly grant the allocated resources for BE traffic to the relay eNB 202. For example, the resource grant can accompany the bearer establishment and/or can be sent following bearer establishment. In another example, where a number of UEs or related connections at relay eNB 202 changes, BE traffic scheduling component 226 can modify the resource allocation, and/or bearer requesting component 214 and bearer establishing component 222 can reestablish or otherwise modify the bearer for the BE traffic.

In one example, BE traffic scheduling component 226 can utilize a proportional fairness algorithm that allocates BE resources to UEs based on the number of UEs. Thus, the subject matter described herein allows donor eNB 204 to determine a count of UEs at one or more relay nodes communicating with donor eNB 204 and/or of UEs communicating directly with donor eNB 204 to allow for proportionally fair allocation of BE resources.

In one example, BE traffic scheduling component 226 can use a BE scheduler similar to the following description. The BE scheduler intends to give equal air time for each UE or related connection (also referred to as a flow) visible to the DeNB 204. The air time, in this example, is distributed in a manner where flows with better instant channel conditions or lower historic throughputs are scheduled with higher priority. Mathematically, the scheduler in this example, strives to achieve the following equilibrium for all active flows:

$$\frac{r_i}{R_i} = \frac{r_j}{R_j}, \forall i, j$$

where $r_i$ denotes the instantaneous data rate of flow i, $R_i$ represents the historic throughput achieved for flow i, $r_j$ denotes the instantaneous data rate of flow j, $R_j$ represents the historic throughput achieved for flow j.

If the BE scheduler strives to give a relay eNB flow the equal air time as it gives to a UE flow that is being directly served by the DeNB 204, regardless how many UE flows are active under an relay eNB, the following condition can occur:

$$\frac{r_{UE_i}}{R_{UE_i}} = \frac{r_{UE_j}}{R_{UE_j}} = \frac{r_{RN_k}}{R_{RN_k}} = \frac{r_{RN_l}}{R_{RN_l}}, \forall i, j, k, l$$

where $r_{UE_i}$ denotes the instantaneous data rate of a flow related to a UE i $R_{UE_i}$ represents the historic throughput achieved for the flow related to UE i, $r_{UE_j}$ denotes the instantaneous data rate of a flow related to a UE j, $R_{UE_j}$ represents the historic throughput achieved for the flow related to UE j, $r_{RN_k}$ denotes the instantaneous data rate of a flow related to a relay eNB (RN) k, $R_{RN_k}$ represents the historic throughput achieved for the flow related to RN k, $r_{RN_l}$ denotes the instantaneous data rate of a flow related to a RN l, and $R_{RN_l}$ represents the historic throughput achieved for the flow related to RN l. Assuming the access channel conditions of UEs under the relay eNB are the same for $RN_k$, and there are $N_{RN_k}$ number of UEs under $RN_k$, then $R_{RN_k} = N_{RN_k} R_{UE_k^m}$, where $UE_k^m$ is the m-th UE under $RN_k$, and hence:

$$\frac{r_{UE_i}}{R_{UE_i}} = \frac{r_{UE_j}}{R_{UE_j}} = \frac{r_{RN_k}}{N_{RN_k} R_{UE_k^m}} = \frac{r_{RN_l}}{N_{RN_l} R_{UE_k^n}}, \forall i, j, k, l, m, n$$

This may not be the desired scheduling result, as described herein.

To achieve the desired result of proportional fairness, the BE scheduler can schedule traffic according to the following:

$$\frac{r_{UE_i}}{R_{UE_i}} = \frac{r_{UE_j}}{R_{UE_j}} = \frac{r_{RN_k}}{R_{RN_k}/N_{RN_k}} = \frac{r_{RN_l}}{R_{RN_l}/N_{RN_l}}, \forall i, j, k, l$$

as it is equivalent to the scheduling principle:

$$\frac{r_{UE_i}}{R_{UE_i}} = \frac{r_{UE_j}}{R_{UE_j}} = \frac{r_{RN_k}}{R_{UE_k^m}} = \frac{r_{RN_l}}{R_{UE_k^m}}, \forall\, i, j, k, l, m, n$$

Therefore, the DeNB 204 can acquire the number of active UE flows served under $RN_k$, denoted as $N_{RN_k}$. The RN can be relay eNB 202. For example, the connection count determining component 224 can obtain the number of UEs, related connections, or flows at relay eNB 202. In this example, the BE traffic scheduling component 226 can then discount the historic throughput of relay eNB 202 by $N_{RN_k}$ to achieve proportional fairness using the scheduling principle.

Connection count determining component 224 can obtain the number of UEs or related connections at relay eNB 202 using various possible implementations. In one example, connection number determining component 210 can ascertain a number of UEs communicating with relay eNB 202 or a number of related connections of the UEs, as described. For example, in LTE, connection number determining component 210 can determine the connections as a number of Uu bearers assigned to UEs communicating with relay eNB 202 or can determine a number of UEs. For example, a Uu bearer can correspond to a bearer between a UE and the relay eNB 202. Moreover, a Un bearer can correspond to a bearer between the relay eNB 202 and donor eNB 204; thus, connection count determining component 224 can determine a number of Uu bearers served over a given Un bearer. Though generally described below in terms of a number of connections, it is to be appreciated that the concepts can be applied to a number of UEs as well. The term flows is also used herein to describe connections, UEs, etc. Connection number indicating component 212 can specify the number of connections to donor eNB 204 for allowing proportionally fair BE scheduling at donor eNB 204, as described.

For example, this can include connection number indicating component 212 explicitly or implicitly specifying a number of BE connections to donor eNB 204. In one example, connection number indicating component 212 can indicate the number of BE connections in a new or existing message communicated between relay eNB 202 and donor eNB 204. In another example, QCI selecting component 216 can indicate the number of UEs by selecting a QCI for a bearer establishment request or otherwise a bearer modification procedure with donor eNB 204. For example, where a bearer is not yet established between relay eNB 202 and donor eNB 204, bearer requesting component 214 can request bearer establishment and can indicate the selected QCI. In another example, where the bearer is established, bearer requesting component 214 can initiate a bearer modification to donor eNB 204 specifying the selected QCI to indicate the number of UEs.

For example, one or more QCI values can be reserved for indicating a number of UEs (e.g., or a range of UEs) at a relay eNB 202. In one example, in LTE, there are 256 possible QCI values; a portion of the QCI values can be defined as indicating a number of served UEs. This can be, for example, a one-to-one mapping of QCI value to number, a mapping of one or more QCI values to a range of numbers, and/or the like. In this example, bearer establishing component 222 can obtain the bearer establishment or modification request from relay eNB 202 with the specified QCI value, and connection count determining component 224 can determine the number of UEs (e.g., or a range of numbers) served by the relay eNB 202 based on the QCI value for computing a resource allocation for the relay eNB 202, as described. BE traffic scheduling component 226 can accordingly determine resource allocation for the BE bearer, and bearer establishing component 222 can grant the bearer establishment request or modify the bearer according to a related request based on the determined resource allocation. Since existing QCI values are used, changes to wireless specifications, such as LTE, may not be required in this example.

In another example, connection number indicating component 212 can transmit the number of UEs to OAM server 206. In this example, connection count determining component 224 can request the number from OAM server 206 and/or one or more other components of the core network that accesses OAM server 206. Similarly, BE traffic scheduling component 226 can utilize the number to compute a resource allocation for relay eNB 202, as described. In another example, connection number indicating component 212 can update the number of UEs at OAM server 206 based at least in part on the connection number determining component 210 detecting the change in the number of UEs as well. Such updating can be detected by OAM server 206, donor eNB 204, etc., and connection count determining component 224 can determine the count for modifying the bearer, as described. Communications with the OAM server 206 can occur using proprietary messages between OAM server 206 and each of relay eNB 202 and/or donor eNB 204.

In yet another example, connection count determining component 224 can determine the number of connections or related UEs at relay eNB 202 without assistance therefrom. For example, connection count determining component 224 can perform packet inspection of communications from relay eNB 202, and/or communications intended for the relay eNB 202 or related UEs (e.g., from a mobility management entity (MME) or similar component) to determine a number of different UEs relating to the communications. Various parameters can be determined from packet inspection. For example, connection count determining component 224 can inspect packets from an MME, and can obtain a subscriber profile identity in an S1 message to determine which messages are related to relay eNB 202. Connection count determining component 224 can inspect these messages to obtain an internet protocol (IP) address, tunnel endpoint identifier (TEID), etc. related to a UE communicating with the relay eNB 202. Based on the number of distinct IP addresses, TEIDs, etc., connection count determining component 224 can obtain a number of UEs communicating with relay eNB 202. It is to be appreciated that connection count determining component 224, in this example, can inspect the packets for a period of time, until a number of repeat addresses, TEIDs, etc., are encountered, and/or the like.

In some cases, for example, the relay eNB 202 can become a bottleneck for communications between its served UEs and donor eNB 204. This can occur, for example, where there is no end-to-end flow control for the served UEs, where relay eNB 202 serves a large number of UEs, where the backhaul link with donor eNB 204 is constrained (e.g., due to poor radio conditions where the backhaul link is wireless), and/or the like. In this regard, relay eNB 202 may not always be able to fully utilize the described BE resources granted by donor eNB 204. In this example, maximum throughput determining component 218 can also feedback a maximum air time in a frame for which relay eNB 202 can be served, $T_{max}$, to the donor eNB 204. Maximum throughput receiving component 228 can obtain $T_{max}$ from relay eNB 202, and BE traffic scheduling component 226 can further consider $T_{max}$ in generating a resource allocation for relay eNB 202.

For example, maximum throughput determining component 218 can provide $T_{max}$ in a QCI or similar parameter related to a request for bearer establishment or modification, as described above with respect to the number of UEs. Thus, in another example, maximum throughput determining component 218 can provide $T_{max}$ to OAM server 206, and/or the like, as described, for retrieval by donor eNB 204. In any case, maximum throughput receiving component 228 can obtain $T_{max}$ for use in scheduling resources to relay eNB 202. In one example, the maximum throughput determining component 218 can compute $T_{max}$, which can be based at least in part on channel conditions at the relay eNB 202 with respect to donor eNB 204, the number of served UEs, and/or the like.

For example, as described, BE traffic scheduling component 226 can strive to achieve the following:

$$\frac{\sum r_{UE_i}}{\sum R_{UE_i}} = \frac{r_{RN}}{R_{RN}/M}, \forall\ i, k, m$$

where $r_{UE_i}$ denotes the channel data rate of the link used by the $i^{th}$ UE; $R_{UE_i}$ denotes the historic throughput of the $i^{th}$ UE; $r_{RN}$ denotes the channel data rate of the backhaul link used by the relay eNB 202; $R_{RN}$ denotes historic throughput of the relay eNB 202. When the relay eNB 202 forms a bottleneck, the relay access link may not be able to serve all UE traffic sent from the donor eNB 204. Hence, in this case:

$$r_{RN}(MT) > r_{RN}^a T_a$$

where T denotes the average amount of air time in a frame that every UE receives in the perception of a donor eNB 204; $r_{RN}^a$ denotes the average channel data rate of the relay eNBs 202 access link to the UEs; and $T_a$ denotes the amount of time in a frame that the relay eNBs 202 access link can be active. $T_a$ can be equal to the time of a frame, $T_F$, where relay eNB 202 is a full duplex relay, as described above.

The average amount of air time in a frame served for the relay eNB 202 can be decreased by a factor $\sigma$, so that $$r_{RN}(MT\sigma) = r_{RN}^a T_a$$

For example, $T_{max} = MT\sigma = r_{RN}^a T_a / r_{RN}$. In an example, as described, maximum throughput determining component 218 can feedback $T_{max}$, or a function of $T_{max}$, to the donor eNB 204. Maximum throughput receiving component 228 can obtain $T_{max}$ from the relay eNB 202, and BE traffic scheduling component 226 can schedule resources for the relay eNB 202 based on $T_{max}$, or the related function. Thus, in an example, BE traffic scheduling component 226 can take advantage of the time varying channel to increase the cell capacity while statistically providing fairness over time, as described. To achieve $r_{RN}(MT\sigma) = r_{RN}^a T_a$, the BE traffic scheduling component 226 can discount the historic throughput of the relay eNB 202 by a factor $\rho$, so that:

$$\frac{\sum r_{UE_i}}{\sum R_{UE_i}} = \frac{r_{RN}}{R_{RN}/(M\rho)}$$

A relationship between $\sigma$ and $\rho$, and subsequently, a relationship between $T_{max}$ and $\rho$ can be derived as follows. Since the BE traffic scheduling component 226 effectively treats the backhaul link as M $\rho$ UEs links, $$(N+M\rho)T' = (N+M)T \quad (1)$$

where T' denotes the updated average amount of air time in a frame that every UE receives in the perception of a donor eNB 204; and N denotes the number of UEs outside of the relay eNB 202 served by the donor eNB 204 (e.g., through one or more other relays or otherwise). Thus:

$$M\rho T' = MT\sigma \quad (2)$$

Solving equations (1) and (2):

$$\rho = \frac{N\sigma}{(N + M(1-\sigma))}$$

or equivalently for the BE traffic scheduling component 226 scheduling algorithm:

$$\rho = \frac{N}{M}\left(\frac{T_{max}}{T_F - T_{max}}\right) \quad (3)$$

Since $T_{max} < MT$ and $T_F - T_{max} > NT$, the following can be true:

$$\rho = \frac{N}{M}\left(\frac{T_{max}}{T_F - T_{max}}\right) < \frac{N}{M}\frac{MT}{NT} = 1$$

Once the connection count determining component 224 obtains M and maximum throughput receiving component 228 obtains $T_{max}$, the BE traffic scheduling component 226 can then calculate $\rho$ using Equation 3 and subsequently uses $$\frac{r_{RN}}{R_{RN}/(M\rho)}$$

as the scheduling metric for a BE bearer for the relay eNB 202. In this example, bearer establishing component 222 can establish the BE bearer with relay eNB 202 according to the scheduling metric, and/or BE traffic scheduling component 226 can schedule traffic over the bearer according to the scheduling metric.

In another yet example, access link rate determining component 220 can determine an individual channel rate of access links to each of the UEs communicating with relay eNB 202. For example, access link rate determining component 220 can receive the rate from respective devices, measure data being sent to the devices over a period of time, and/or the like. In any case, access link rate determining component 220 can communicate access link rates for each access link to donor eNB 204. Access link rate receiving component 230 can obtain the access link rates, and BE traffic scheduling component 226 can utilize the access link rates to determine resources to allocate to the BE bearer for relay eNB 202 (e.g., initially in a bearer establishment request, subsequently in a bearer modification request, in scheduling resources over an established bearer, and/or the like). For example, BE traffic scheduling component 226 can schedule resources for the BE bearer with relay eNB 202 sufficient to handle the access link rates of the devices communicating with the relay eNB 202.

Figure 3:
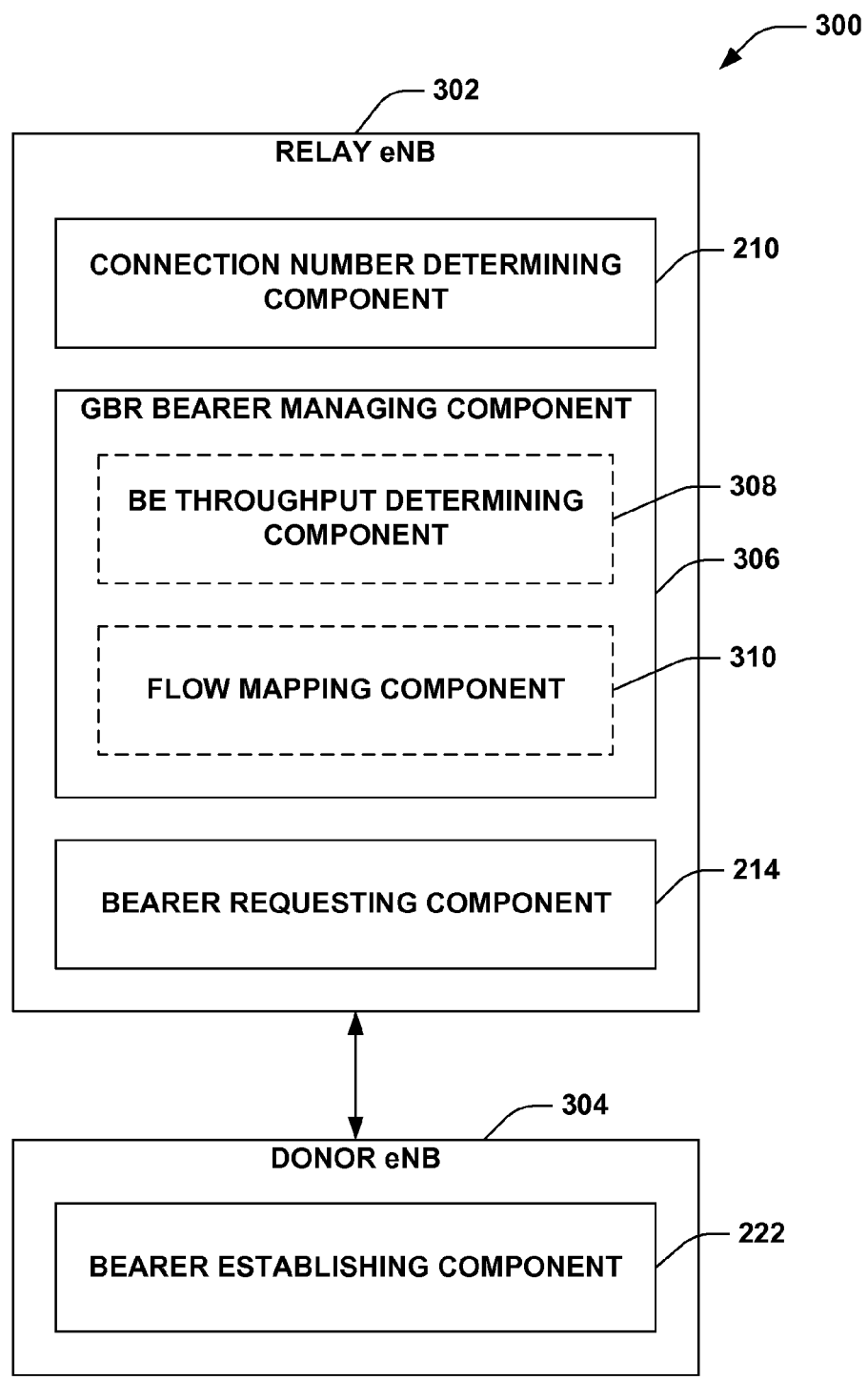
FIG. 3 is a block diagram of an aspect of a system for requesting a guaranteed bit rate (GBR) bearer from a donor evolved Node B (eNB) for best effort (BE) traffic.

Referring to FIG. 3, an example system 300 for requesting a GBR bearer to handle BE traffic is shown. System 300 comprises a relay eNB 302 that provides wireless network access to one or more UEs (not shown) through donor eNB 304. Relay eNB 302 can be similar to relay eNBs 104 and/or 106, as described. Donor eNB 304 can be similar to donor eNB 102. For example, relay eNB 302 can be substantially any relay, such as a wired or wireless relay, a UE, etc., and donor eNB 304 can be substantially any access point, as described.

Relay eNB 302 can comprise a connection number determining component 210 for obtaining a number of UEs communicating with relay eNB 202 (or a number of related connections), a GBR bearer managing component 306 for establishing a GBR bearer for handling BE traffic, and a bearer requesting component 214 for establishing one or more GBR or BE bearers with another eNB for providing wireless network access to the number of UEs. GBR bearer managing component 306 can include a BE throughput determining component 308 for measuring throughput at a BE (or other non-GBR) bearer, and a flow mapping component 310 for mapping one or more flows related to a UE or corresponding connections to the GBR bearer.

Donor eNB 204 can comprise a bearer establishing component 222 for establishing one or more bearers with a relay eNB, UE, etc. for communicating in a wireless network.

According to an example, bearer requesting component 214 can request establishment of a GBR bearer from donor eNB 304 to handle BE traffic from relay eNB 302. The GBR bearer managing component 306, however, may not initially know the proportionally fair data rate of other BE bearers provided to UEs communicating with donor eNB 304 (e.g., or other relays connected thereto). This information can be desirable for requesting a GBR bearer from the donor eNB 304 that has a data rate sufficient to provide the proportionally fair data rate for BE traffic of UEs communicating with the relay eNB 302.

In this regard, for example, bearer requesting component 214 can request and maintain at least one BE bearer with donor eNB 304 for a UE communicating BE traffic with relay eNB 302. Bearer establishing component 222 can establish the BE bearer, as described above, and can assign a proportionally fair scheduling to the BE bearer. In this regard, BE throughput determining component 308 can measure throughput of the BE bearer to determine the proportionally fair data rate scheduled by the donor eNB 304 for the BE bearer. Initially, GBR bearer managing component 306 can compute a bit rate for requesting a GBR bearer to handle other UEs' BE traffic as the measured throughput of the BE bearer multiplied by the number of UEs or related BE connections (e.g., without the UE assigned the BE bearer for measuring by BE throughput determining component 308). Bearer requesting component 214 can request the GBR bearer from donor eNB 304, and bearer establishing component 222 can grant the GBR bearer to relay eNB 302. In another example, an existing bearer can be modified according to the bit rate determined by the GBR bearer managing component 306. In this example, flow mapping component 310 can map flows related to BE resources, or related connections, to the GBR bearer for communicating BE traffic thereover. For example, flow mapping component 310 can provide the UEs related to the flows with substantially equal portions of the GBR bearer for communicating the BE traffic over the flows through donor eNB 304.

It is to be appreciated, however, that injecting the GBR bearer may lower resources available at donor eNB 304, and thus lower the BE traffic throughput. In this regard, after initially computing the bit rate, GBR bearer managing component 306 can adjust the bit rate based on one or more computations, such as a determined updated BE traffic throughput caused by injection of the GBR bearer. In one example, GBR bearer managing component 306 can calculate the initial bit rate described above according to the following formula:

$$\frac{R_{ngbr}^{(0)}}{\sum_{i=1}^{N} R_i^{(0)}} = \frac{r_{RN}}{\sum_{i=1}^{N} r_i}$$

$$C = R_{ngbr}^{(0)} + \sum_{i=1}^{N} R_i^{(0)}$$

where $R_{ngbr}^{(0)}$ denotes the measured BE bearer throughput as assigned under the relay eNB 302, $R_i^{(0)}$ denotes the initial throughput of an unknown BE bearer served under the donor eNB 304, C is the unknown total capacity for the BE bearers under the donor eNB 304, $r_{RN}$ denotes the channel data rate of the relay eNB 302 backhaul link to donor eNB 204, $r_i$ denotes the channel capacity of an unknown non-GBR bearer link served under the donor eNB 204. In this example, GBR bearer managing component 306 can probe the throughput of the BE bearer assigned to relay eNB 302 after injecting the GBR bearer to accordingly adjust the data rate of the GBR bearer. In one example, this computation can be performed according to the following formula:

$$\frac{R_{ngbr}^{(1)}}{\sum_{i=1}^{N} R_i^{(1)}} = \frac{r_{RN}}{\sum_{i=1}^{N} r_i}$$

$$C = (N_{ue} - 1)R_{ngbr}^{(0)} + R_{ngbr}^{(1)} + \sum_{i=1}^{N} R_i^{(1)}$$

where $R_{ngbr}^{(1)}$ denotes the single BE bearer throughput under the relay eNB 302 after injecting the GBR bearer, $R_i^{(1)}$ denotes the throughput of an unknown BE bearer served under the donor eNB 304 after injecting the GBR bearer. Moreover, in this example, GBR bearer managing component 306 can determine a final bit rate for the GBR bearer based on the following formula:

$$\frac{R_{ngbr}^{(2)}}{\sum_{i=1}^{N} R_i^{(2)}} = \frac{r_{RN}}{\sum_{i=1}^{N} r_i}$$

$$C = N_{ue} R_{ngbr}^{(2)} + \sum_{i=1}^{N} R_i^{(2)}$$

where $R_{ngbr}^{(2)}$ denotes the final BE bearer throughput under the relay eNB 302 after GBR bearer adjustment, $R_i^{(2)}$ denotes the final throughput of an unknown BE bearer served under the donor eNB 304 after GBR bearer adjustment. Solving the above six equations for six unknowns:

$$C, \frac{r_{RN}}{\sum_{i=1}^{N} r_i}, \sum_{i=1}^{N} R_i^{(0)}, \sum_{i=1}^{N} R_i^{(1)}, \sum_{i=1}^{N} R_i^{(2)}, R_{ngbr}^{(2)},$$

GBR bearer managing component 306 can compute the data rate for the GBR bearer equal to $MR_{ngbr}^{(2)}$, and bearer requesting component 214 can adjust the bit rate of the GBR by initiating a bearer modification procedure to handle BE traffic of the various UEs communicating with relay eNB 202 (e.g., not including the UE that already utilizes the single BE bearer).

Figure 4:
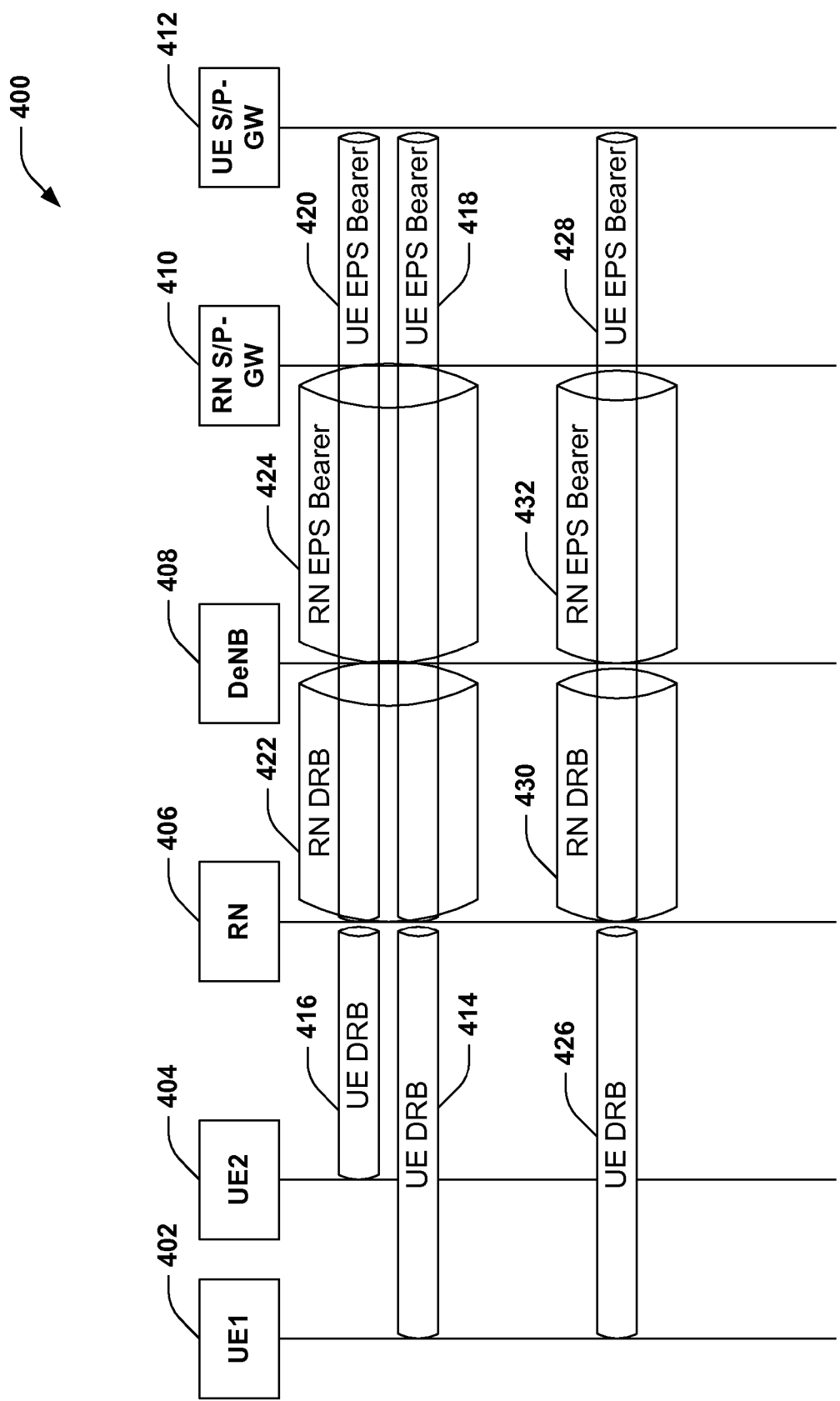
FIG. 4 is a block diagram of an aspect of a system for allocating resources to a relay based on a number of served UEs.

In FIG. 4, an example system 400 is shown illustrating an example LTE/LTE-A architecture in accordance with aspects described herein. System 400 includes UE1 402 and UE2 404 that communicate with a relay eNB (RN) 406 for wireless network access. RN 406 communicates with a DeNB 408 to provide the wireless network access. DeNB 408, in turn, communicates with various core network nodes, including a RN serving gateway (S-GW) or packet data network (PDN) gateway (P-GW), collectively referred to as a RN S/P-GW 410, as well as one or more UE S/P-GW 412.

UE1 402 and UE2 can respectively establish dedicated radio bearers (DRB) 414 and 416 with RN 406. These DRBs 414 and 416, also referred to herein as Uu bearers, can be for BE traffic. Thus, RN 406 establishes a single RN DRB 422 with DeNB 408 to handle the BE traffic for UE DRBs 414 and 416. This RN DRB 422 is also referred to herein as a Un bearer. As described, DeNB 408 can determine a count of UE BE DRBs handled by RN 406, which can be determined based on indication from the RN 406, packet inspection at DeNB 408, and/or the like, as described. In another example, RN DRB 422 can be established as a GBR bearer with a bit rate sufficient to provide proportionally fair scheduling to UE DRBs 414 and 416 similar to other UE DRBs served by DeNB 408, as described. Moreover, for example, RN 406 can communicate a maximum throughput and/or access link rate to DeNB 408 for scheduling resources over RN DRB 422.

DeNB 408 can accordingly establish a RN evolved packet system (EPS) bearer 424 with RN S/P-GW 410 related to RN DRB 422 for communicating data received over the RN DRB 422 in the core network, and also for communicating network data related to RN 406 received in the RN EPS bearer 424 over the RN DRB 422. For example, DeNB 408 can associate an identifier with the RN EPS bearer 424 to identify RN EPS bearer 424 in the core network, such as an S1 identifier. In another example, DeNB 408 can encapsulate communications from the RN 406 in a tunneling protocol including a tunnel endpoint identifier (TEID) in a header related to RN 406. Thus, for example, core network communications related to RN EPS bearer 424 can be communicated among DeNB 408 and various nodes, such as RN S/P-GW 410, UE SIP-GW 412, etc. using the tunneling protocol (e.g., general packet radio services (GPRS) tunneling protocol (GTP)) with a header that specifies the TEID for routing the communications.

In another example, RN 406 can establish UE EPS bearers 418 and 420 for UE DRBs 414 and 416, respectively, with UE S/P-GW 412. Thus, data received from the core network at RN 406 over UE EPS bearer 418 can be sent to UE1 402 over UE DRB 414, and data received at RN 406 over UE EPS bearer 420 can be sent to UE2 404 over UE DRB 416. In any case, the single RN DRB 422 and related RN EPS bearer 424 are used to handle BE data related to UE DRBs 414 and 416 and UE EPS bearers 418 and 420. Thus, UE1 402 and UE2 404 traffic received over UE DRBs 414 and 416 are sent over RN DRB 422 to DeNB 408. RN 406 can similarly encapsulate UE1 402 or UE2 404 communications in a GTP with a TEID to identify the related UE. In any case, RN S/P-GW 410 receives the traffic from DeNB 408 and removes the tunneling protocol header, and can forward on traffic over respective UE EPS bearers 418 and 420. UE S/P-GW 412 can also remove tunneling protocol header information from the traffic and determine a related UE. Similarly, UE S/P-GW 412 can package data intended for UE1 402 or UE2 404 in a GTP with a TEID identifying UE1 402 or UE2 404. RN S/P-GW 410 can further package data received over the UE EPS bearers 418 and 420 from UE S/P-GW 412 with a tunneling protocol header related to RN 406, and can communicate the data to DeNB 408. DeNB 408 identifies the RN 406 based on the header and forwards the data to RN 406, which can forward data to UE1 402 and/or UE2 404 over respective DRB 414 or 416.

In one example described above, DeNB 408 can utilize the S1 or TEID of RN 406 to identify upstream or downstream packets related thereto, and can count different UE TEIDs in the packets to determine a number of UEs served by RN 406.

In addition, UE1 402 is shown as having a GBR (or QoS) bearer with RN 406 as well. UE DRB 426 is established with RN 406 as a GBR bearer. RN 406 can establish a dedicated RN DRB 430 with DeNB 408 to handle traffic received over UE DRB 426. DeNB 408 establishes a RN EPS bearer 432 with RN S/P-GW 410 for RN DRB 430, as described above, and similarly, RN 406 establishes a UE EPS bearer 428 with UE S/P-GW 412 for UE DRB 426.

Referring to FIGS. 5-9, example methodologies relating to assigning BE traffic resources to relays for providing to served UEs are illustrated. While, for purposes of simplicity of explanation, the methodologies are shown and described as a series of acts, it is to be understood and appreciated that the methodologies are not limited by the order of acts, as some acts may, in accordance with one or more embodiments, occur concurrently with other acts and/or in different orders from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

Figure 5:
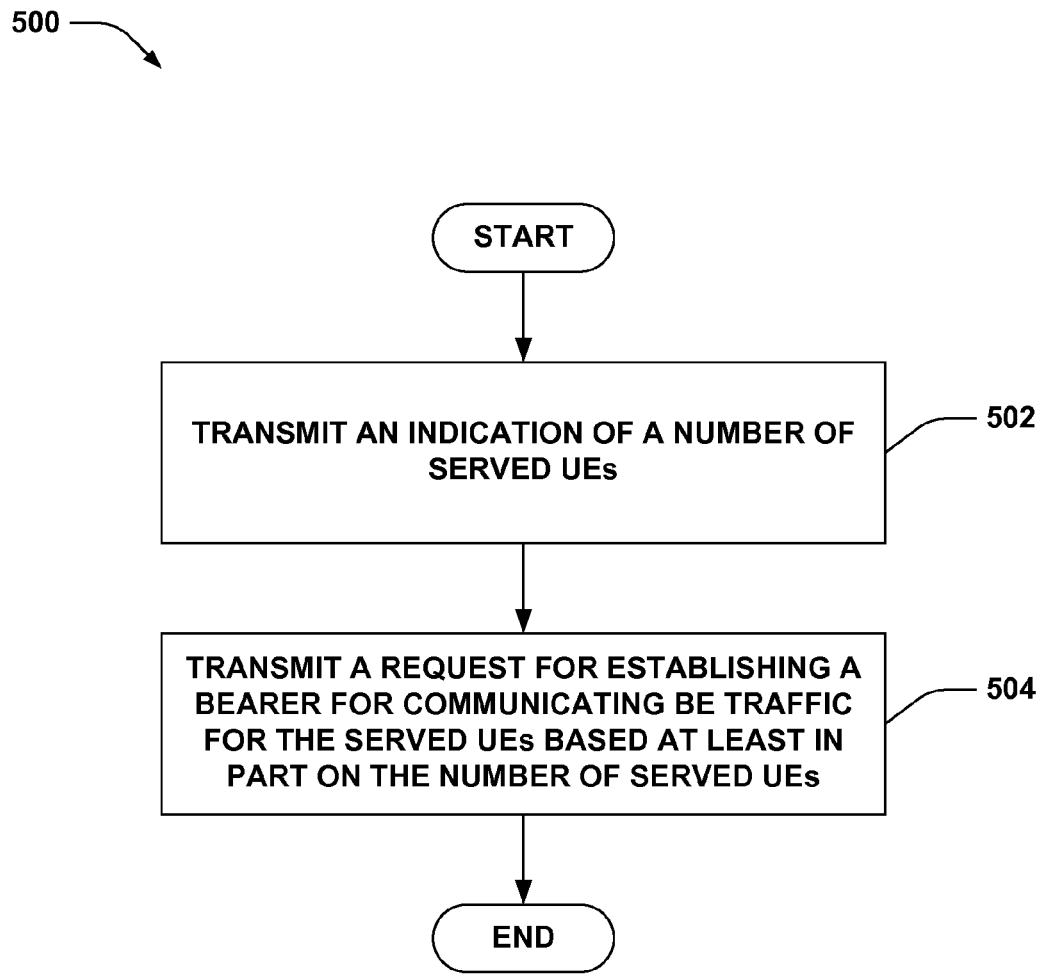
FIG. 5 is a flow chart of an aspect of a methodology for establishing a bearer based on an indicated number of served UEs.

Turning to FIG. 5, an example methodology 500 for indicating a number of served UEs to facilitate BE traffic scheduling is illustrated.

At 502, an indication of a number of served UEs can be transmitted. For example, this can include indicating the number of served UEs using a QCI in a bearer establishment or modification request, as described. In another example, this can include signaling the number of served UEs to a donor eNB, an OAM server, etc.

At 504, a request for establishing a bearer for communicating BE traffic for the served UEs based at least in part on the number of served UEs can be transmitted. As described, the request can include the QCI indicating the number of served UEs, in one example. The request can be transmitted to a donor eNB for receiving resources for communicating the BE traffic, and the donor eNB, as described, can assign resources based on the number of served UEs to provide proportionally fair scheduling to the UEs and other UEs served by donor eNB.

Figure 6:
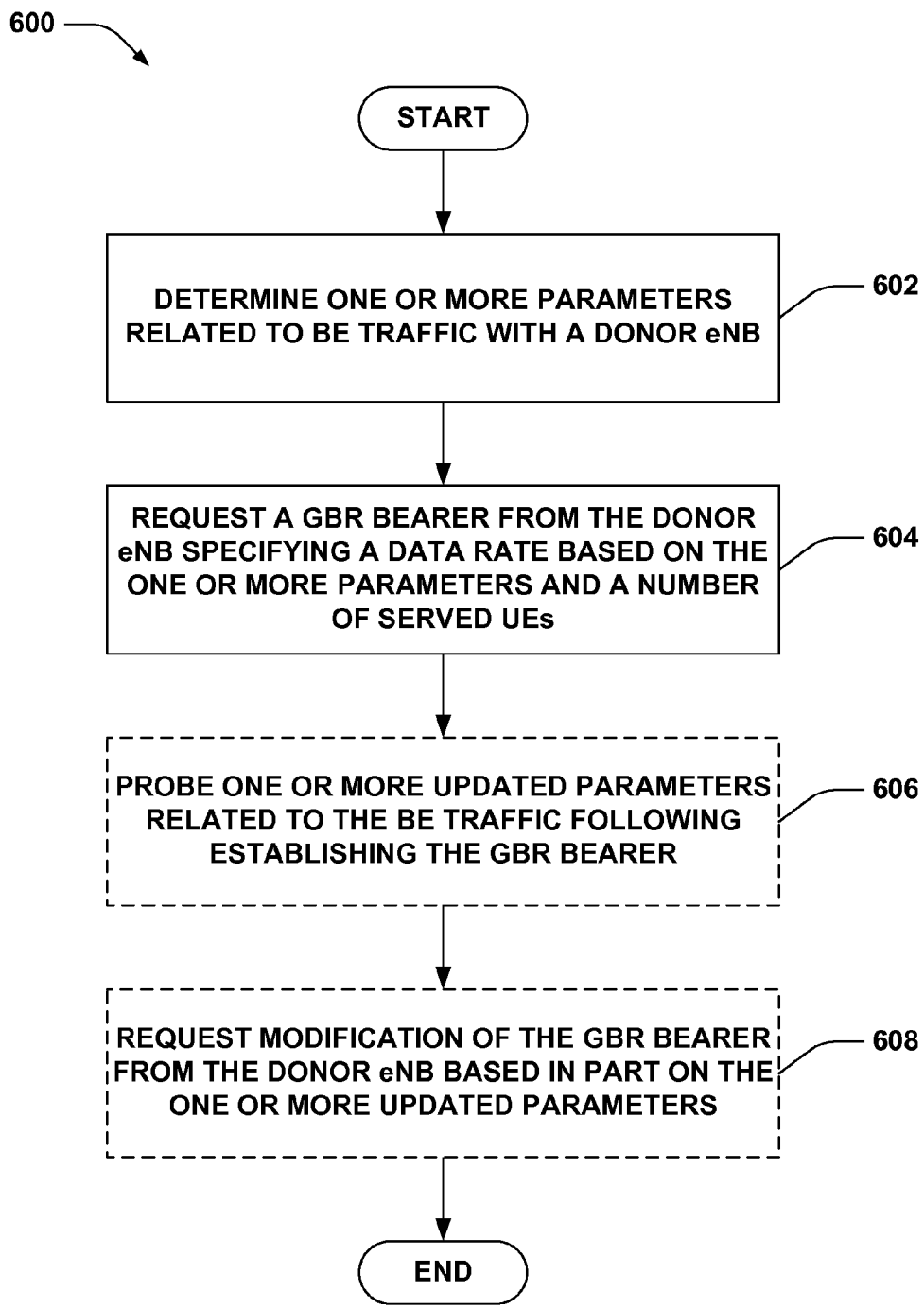
FIG. 6 is a flow chart of an aspect of a methodology for requesting a GBR bearer to handle BE traffic.

Referring to FIG. 6, an example methodology 600 is shown for requesting a GBR bearer to handle BE traffic.

At 602, one or more parameters related to BE traffic with a donor eNB can be determined. For example, the one or more parameters can correspond to a monitored data rate over a BE bearer with the donor eNB, a resource allocation granted to the BE bearer by the donor eNB, and/or the like. For example, the data rate can be monitored based on determining a throughput of data over a period of time, based on receiving an indication from the donor eNB regarding the data rate, and/or the like.

At 604, a GBR bearer can be requested from the donor eNB specifying a data rate based on the one or more parameters and a number of served UEs. For example, the GBR can be requested at a bit rate substantially equal to the monitored data rate of the BE traffic multiplied by the number of served UEs. Thus, the GBR bearer can be established with the donor eNB, as described, and BE traffic from the served devices can be mapped onto the GBR bearer for communicating to the donor eNB. Thus, the BE traffic is provided with proportionally fair scheduling based on the number of served UEs. Injecting this GBR bearer can cause modification to the BE traffic scheduling, however.

Thus, optionally at 606, one or more updated parameters related to the BE traffic can be probed following establishing the GBR bearer. For example, this can include obtaining the current BE traffic data rate, which can have decreased based on the GBR bearer establishment.

Optionally, at 608, modification of the GBR bearer is requested from the donor eNB based in part on the one or more updated parameters. Thus, for example, the GBR data rate can be modified as the updated BE traffic data rate multiplied by the number of UEs, as described.

Figure 7:
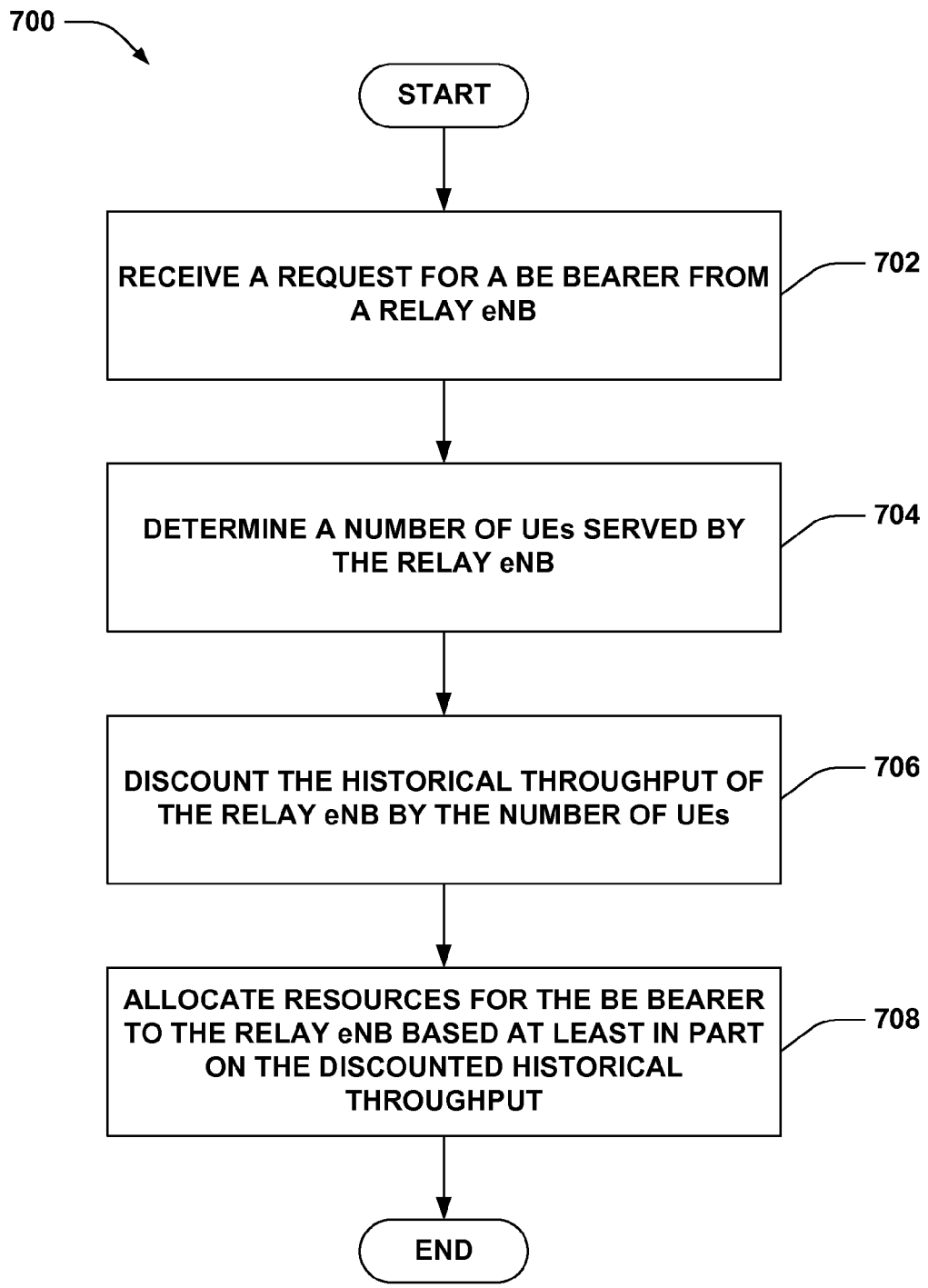
FIG. 7 is a flow chart of an aspect of a methodology for allocating resources to a relay based on a number of served UEs.

Turning to FIG. 7, an example methodology 700 is illustrated for allocating resources to a relay eNB for BE traffic based on a number of served devices.

At 702, a request for a BE bearer can be received from a relay eNB. For example, the request can be received as a RRCConnectionEstablishment, RRCConnectionReconfiguration, and/or the like. In one example, the request can include an indication of a number of UEs served by the relay eNB. For instance, the number of UEs can be explicitly indicated, implicitly indicated using one or more parameters (e.g., QCI), and/or the like.

At 704, the number of UEs served by the relay eNB can be determined. For example, this can include obtaining a number of served UEs indicated in the bearer request (e.g., obtaining the explicit indication, obtaining the QCI and determining the number of served UEs related to the QCI, etc.). In another example, this can include inspecting packets received from the relay eNB and/or intended for the relay eNB to determine a number of different identifiers encountered (e.g., TEID or other identifiers unique to UEs or related flows). The number of different identifiers can correspond to the number of served UEs.

At 706, the historical throughput of the relay eNB can be discounted by the number of UEs. For example, a scheduler can determine a resource allocation for various devices, including the relay eNB, based on historical throughput. The relay eNB can communicate with a number of devices, and thus the historical throughput used by the scheduler can be discounted by the number of devices to obtain a proportionally fair resource allocation from the donor eNB.

At 708, resources can be allocated for the BE bearer to the relay eNB based in part on the discounted historical throughput. For example, using the discounted historical throughput can cause the donor eNB to allocate additional resources to the relay eNB as compared to a UE served directly by the donor eNB or relay eNB serving a lower number of UEs. Thus, the relay eNB can receive the resource allocation and can accordingly assign the resources to each of the served UEs to provide the proportionally fair scheduling.

Figure 8:
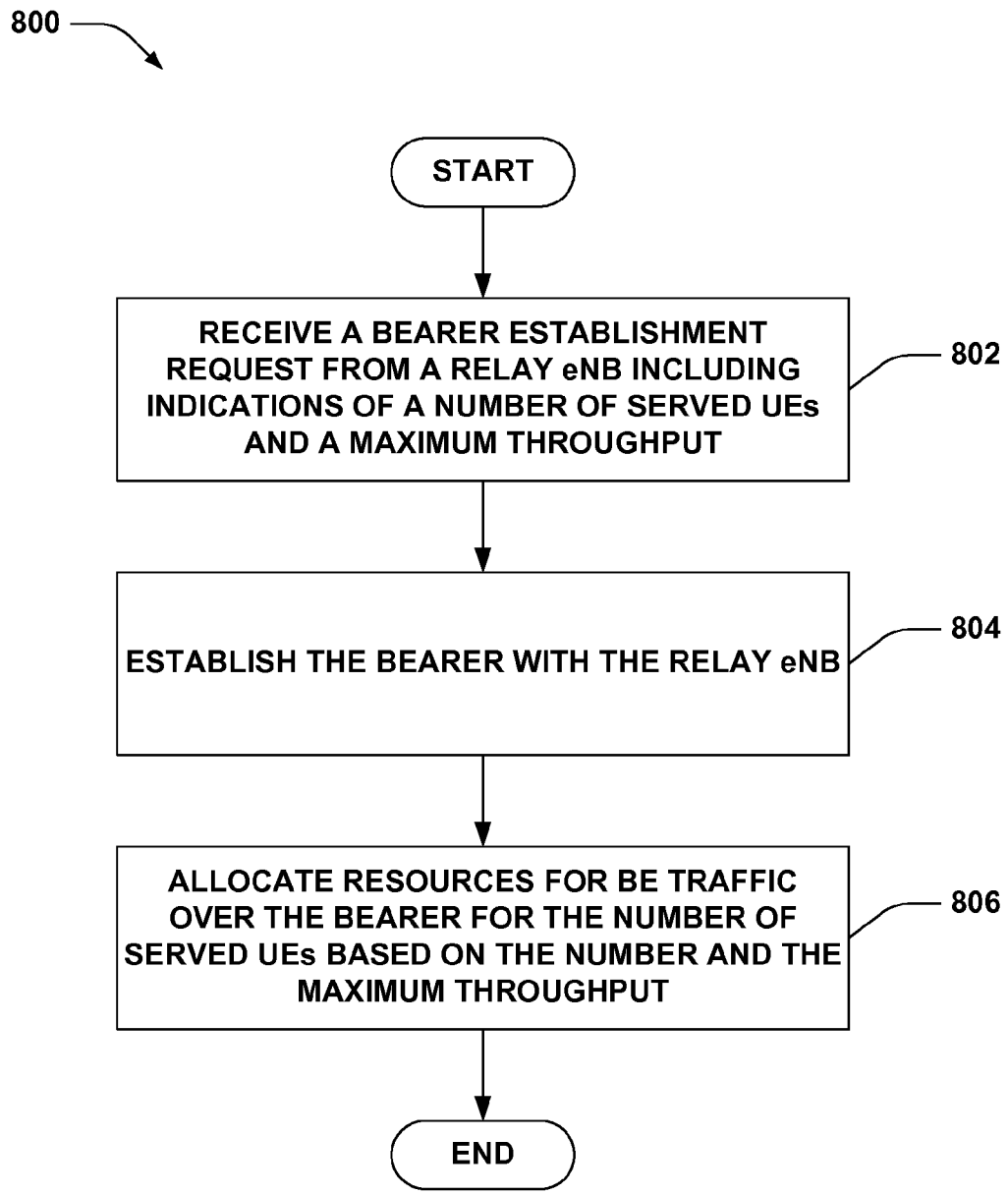
FIG. 8 is a flow chart of an aspect of a methodology for allocating resources to a relay based on a maximum throughput.

Referring to FIG. 8, an example methodology 800 that facilitates scheduling BE traffic for a relay eNB is illustrated.

At 802, a bearer establishment request can be received from a relay eNB including indications of a number of served UEs and a maximum throughput. The indications can be received as part of the request or in other messages, for example. In one example, the number of UEs can be received as a QCI related to the request. Receiving the request can include receiving an RRCConnectionEstablishment, RRC-ConnectionReconfiguration, or similar message from the relay eNB.

At 804, the bearer can be established with the relay eNB. This can include allocating resources to the relay eNB, and/or communicating an RRCConnectionComplete to similar message to the relay eNB, etc.

At 806, resources for the BE traffic over the bearer can be allocated for the number of served UEs based on the number and the maximum throughput. For example, this can include allocating resources based on the number of served UEs, as described, in view of the maximum throughput, such that where the allocated resources may result in exceeding the maximum throughput, resources can be allocated up to the maximum throughput instead.

Figure 9:
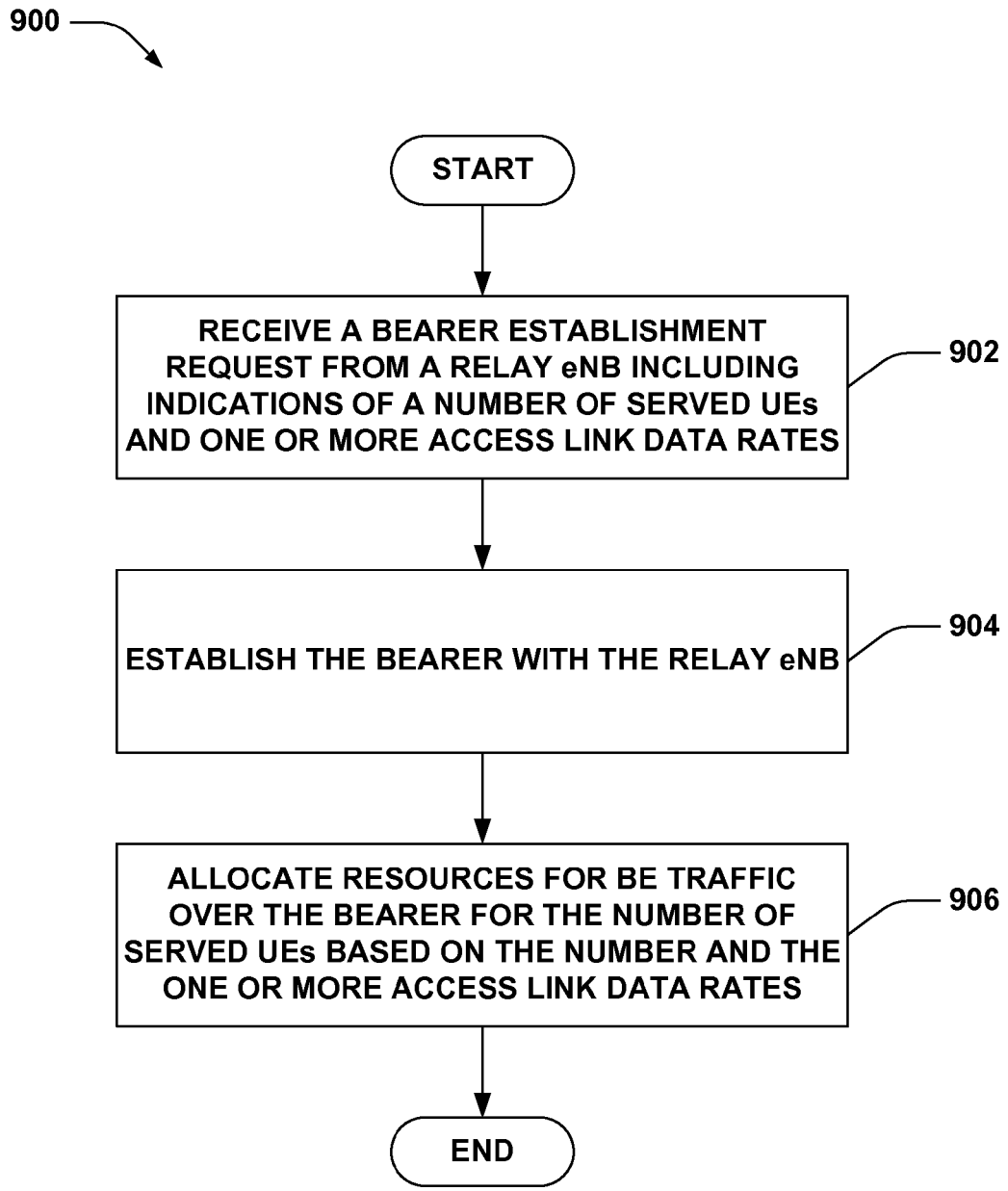
FIG. 9 is a flow chart of an aspect of a methodology for allocating resources to a relay based on one or more access link data rates.

Referring to FIG. 9, an example methodology 900 that facilitates scheduling BE traffic for a relay eNB is illustrated.

At 902, a bearer establishment request can be received from a relay eNB including indications of a number of served UEs and one or more access link data rates. The indications can be received as part of the request or in other messages, for example. In one example, the number of UEs can be received as a QCI related to the request. Receiving the request can include receiving an RRCConnectionEstablishment, RRC-ConnectionReconfiguration, or similar message from the relay eNB.

At 904, the bearer can be established with the relay eNB. This can include allocating resources to the relay eNB, and/or communicating an RRCConnectionComplete to similar message to the relay eNB, etc.

At 906, resources for the BE traffic over the bearer can be allocated for the number of served UEs based on the number and the one or more access link data rates. For example, this can include allocating resources based on the number of served UEs, as described, in view of the one or more access link data rates, such that where the allocated resources may result in exceeding the maximum throughput, resources can be allocated up that necessary to serve according to the one or more access link data rates.

It will be appreciated that, in accordance with one or more aspects described herein, inferences can be made regarding determining or indicating a number of served UEs, determining a historical throughput, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 10:
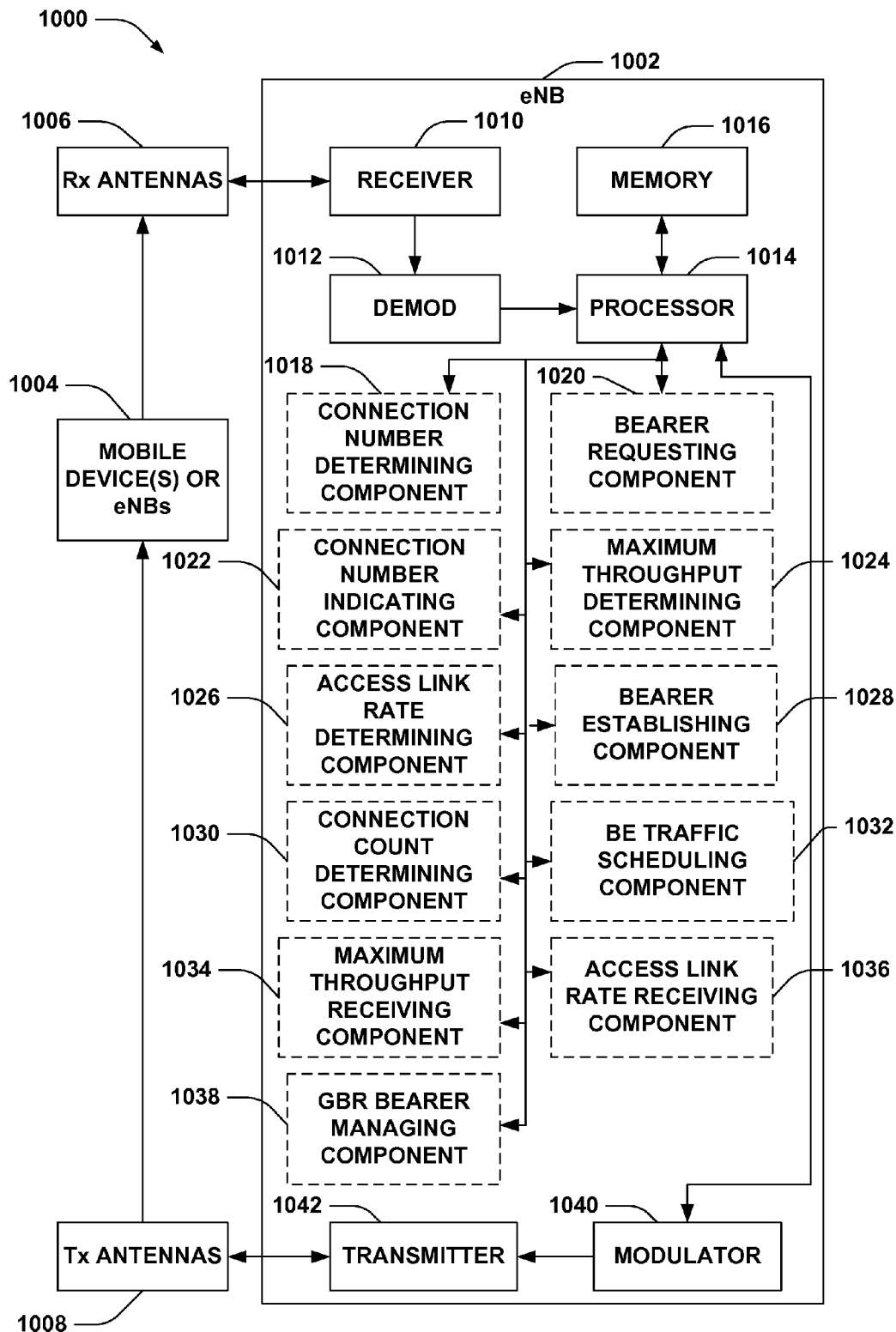
FIG. 10 is a block diagram of an aspect of a relay or donor eNB in accordance with aspects described herein.

FIG. 10 is an illustration of a system 1000 that facilitates requesting or allocating resources based on a number of served UEs. System 1000 includes a eNB 1002 having a receiver 1010 that receives signal(s) from one or more mobile devices or eNBs 1004 through a plurality of receive antennas 1006 (e.g., which can be of multiple network technologies), and a transmitter 1042 that transmits to the one or more mobile devices or eNBs 1004 through a plurality of transmit antennas 1008 (e.g., which can be of multiple network technologies). eNB 1002 can be a relay eNB or donor eNB, as described herein. For example, eNB 1002 can transmit signals received from eNBs 1004 to other eNBs 1004, and/or vice versa. Receiver 1010 can receive information from one or more receive antennas 1006 and is operatively associated with a demodulator 1012 that demodulates received information. In addition, in an example, receiver 1010 can receive from a wired backhaul link. Though depicted as separate antennas, it is to be appreciated that at least one of receive antennas 1006 and a corresponding one of transmit antennas 1008 can be combined as the same antenna. Demodulated symbols are analyzed by a processor 1014, which is coupled to a memory 1016 that stores information related to performing one or more aspects described herein.

Processor 1014, for example, can be a processor dedicated to analyzing information received by receiver 1010 and/or generating information for transmission by a transmitter 1042, a processor that controls one or more components of eNB 1002, and/or a processor that analyzes information received by receiver 1010, generates information for transmission by transmitter 1042, and controls one or more components of eNB 1002. In addition, processor 1014 can perform one or more functions described herein and/or can communicate with components for such a purpose.

Memory 1016, as described, is operatively coupled to processor 1014 and can store data to be transmitted, received data, information related to available channels, data associated with analyzed signal and/or interference strength, information related to an assigned channel, power, rate, or the like, and any other suitable information for estimating a channel and communicating via the channel. Memory 1016 can additionally store protocols and/or algorithms associated with mitigating self-interference of eNB 1002.

It will be appreciated that the data store (e.g., memory 1016) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1016 of the subject systems and methods is intended to comprise, without being limited to, these and any other suitable types of memory.

Processor 1014 is further optionally coupled to a connection number determining component 1018, which can be similar to connection number determining component 210, a bearer requesting component 1020, which can be similar to bearer requesting component 214, a connection number indicating component 1022, which can be similar to connection number indicating component 212, a maximum throughput determining component 1024, which can be similar to maximum throughput determining component 218, and/or an access link rate determining component 1026, which can be similar to access link rate determining component 220. Processor 1014 can further be operatively coupled to a bearer establishing component 1028, which can be similar to bearer establishing component 222, a connection count determining component 1030, which can be similar to connection count determining component 224, a BE traffic scheduling component 1032, which can be similar to BE traffic scheduling component 226, a maximum throughput receiving component 1034, which can be similar to maximum throughput receiving component 228, an access link rate receiving component 1036, which can be similar to an access link rate receiving component 230, and/or a GBR bearer managing component 1038, which can be similar to GBR bearer managing component 306.

Moreover, for example, processor 1014 can modulate signals to be transmitted using modulator 1040, and transmit modulated signals using transmitter 1042. Transmitter 1042 can transmit signals to mobile devices or eNBs 1004 over Tx antennas 1008. Furthermore, although depicted as being separate from the processor 1014, it is to be appreciated that the connection number determining component 1018, bearer requesting component 1020, connection number indicating component 1022, maximum throughput determining component 1024, access link rate determining component 1026, bearer establishing component 1028, connection count determining component 1030, BE traffic scheduling component 1032, maximum throughput receiving component 1034, access link rate receiving component 1036, GBR bearer managing component 1038, demodulator 1012, and/or modulator 1040 can be part of the processor 1014 or multiple processors (not shown), and/or stored as instructions in memory 1016 for execution by processor 1014.

Figure 11:
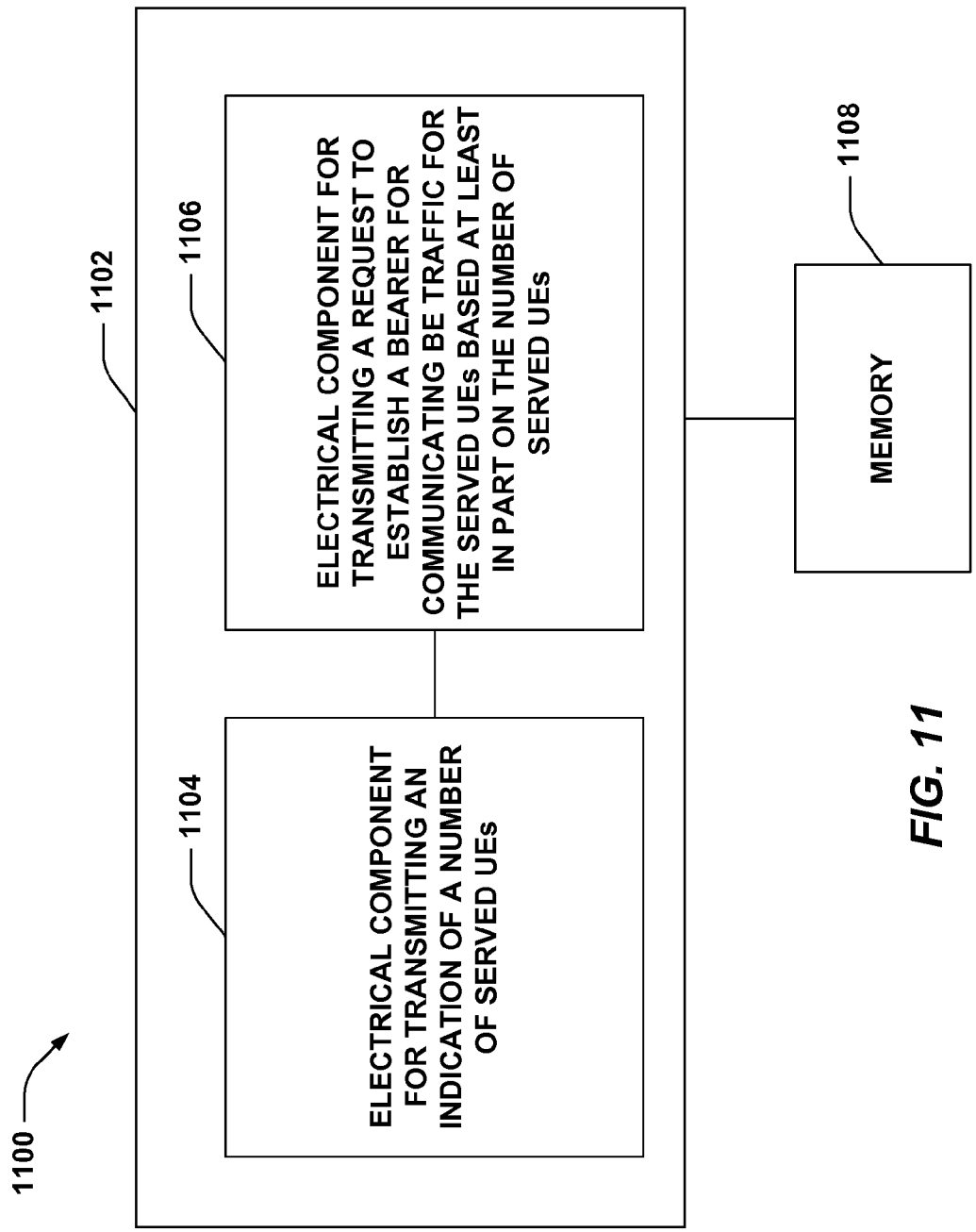
FIG. 11 is a block diagram of an aspect of a system that establishes a bearer based on an indicated number of served UEs.

With reference to FIG. 11, illustrated is a system 1100 that requests bearer establishment based on indicating a number of served UEs. For example, system 1100 can reside at least partially within a relay. It is to be appreciated that system 1100 is represented as including functional blocks, which can be functional blocks that represent functions implemented by a processor, software/firmware, or combinations thereof. System 1100 includes a logical grouping 1102 of components (e.g., electrical components) that can act in conjunction. For instance, logical grouping 1102 can include an electrical component for transmitting an indication of a number of served UEs (1104). Further, logical grouping 1102 can include an electrical component for transmitting a request to establish a bearer for communicating BE traffic for the served UEs based at least in part on the number of served UEs (1106).

As described, for example, electrical component 1104 can indicate the number of served UEs as a QCI in the bearer request, an explicit indication in a different message, an indication to an OAM from which the number is obtained, and/or the like. For example, electrical component 1104 can include a connection number indicating component 212. In addition, for example, electrical component 1106, in an aspect, can include a bearer requesting component 214, for example.

Additionally, system 1100 can include a memory 1108 that retains instructions for executing functions associated with the electrical components 1104 and 1106. While shown as being external to memory 1108, it is to be understood that one or more of the electrical components 1104 and 1106 can exist within memory 1108. In one example, electrical components 1104 and 1106 can include at least one processor, or each electrical component 1104 and 1106 can be a corresponding module of at least one processor. Moreover, in an additional or alternative example, components 1104 and 1106 can be a computer program product comprising a computer readable medium, where each component 1104 and 1106 can be corresponding code.

Figure 12:
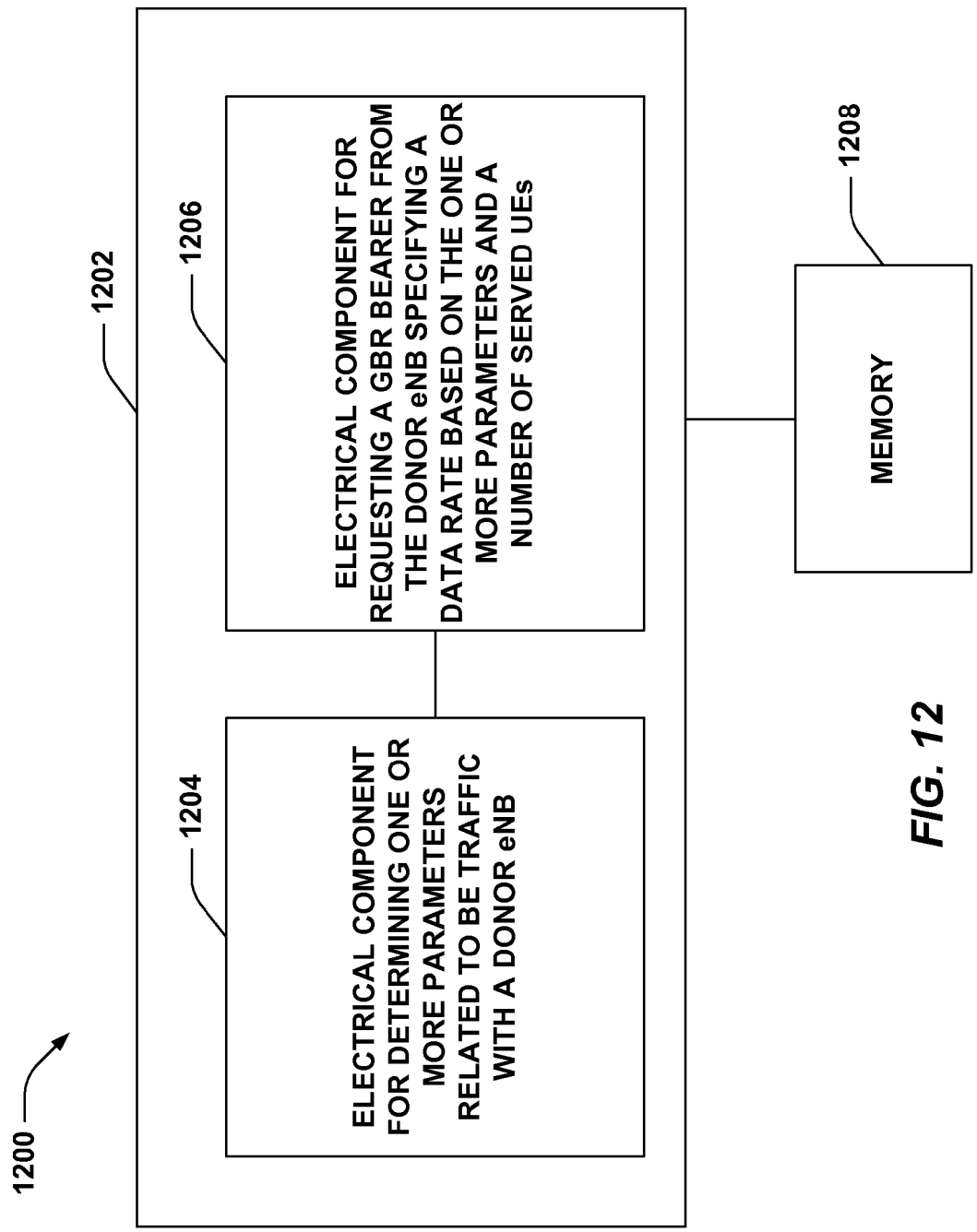
FIG. 12 is a block diagram of an aspect of a system that requests a GBR bearer to handle BE traffic.

With reference to FIG. 12, illustrated is a system 1200 that requests GBR bearer establishment for BE traffic. For example, system 1200 can reside at least partially within a relay. It is to be appreciated that system 1200 is represented as including functional blocks, which can be functional blocks that represent functions implemented by a processor, software/firmware, or combinations thereof. System 1200 includes a logical grouping 1202 of components (e.g., electrical components) that can act in conjunction. For instance, logical grouping 1202 can include an electrical component for determining one or more parameters related to BE traffic with a donor eNB (1204). Further, logical grouping 1202 can include an electrical component for requesting a GBR bearer from the donor eNB specifying a data rate based on the one or more parameters and a number of served UEs (1206).

As described, for example, electrical component 1206 can further request modification of the GBR bearer based on determining updated parameters (e.g., BE traffic data rate) following establishment of the GBR bearer. For example, electrical component 1204 can include a BE throughput determining component 308. In addition, for example, electrical component 1206, in an aspect, can include a GBR bearer managing component, for example.

Additionally, system 1200 can include a memory 1208 that retains instructions for executing functions associated with the electrical components 1204 and 1206. While shown as being external to memory 1208, it is to be understood that one or more of the electrical components 1204 and 1206 can exist within memory 1208. In one example, electrical components 1204 and 1206 can include at least one processor, or each electrical component 1204 and 1206 can be a corresponding module of at least one processor. Moreover, in an additional or alternative example, components 1204 and 1206 can be a computer program product comprising a computer readable medium, where each component 1204 and 1206 can be corresponding code.

Figure 13:
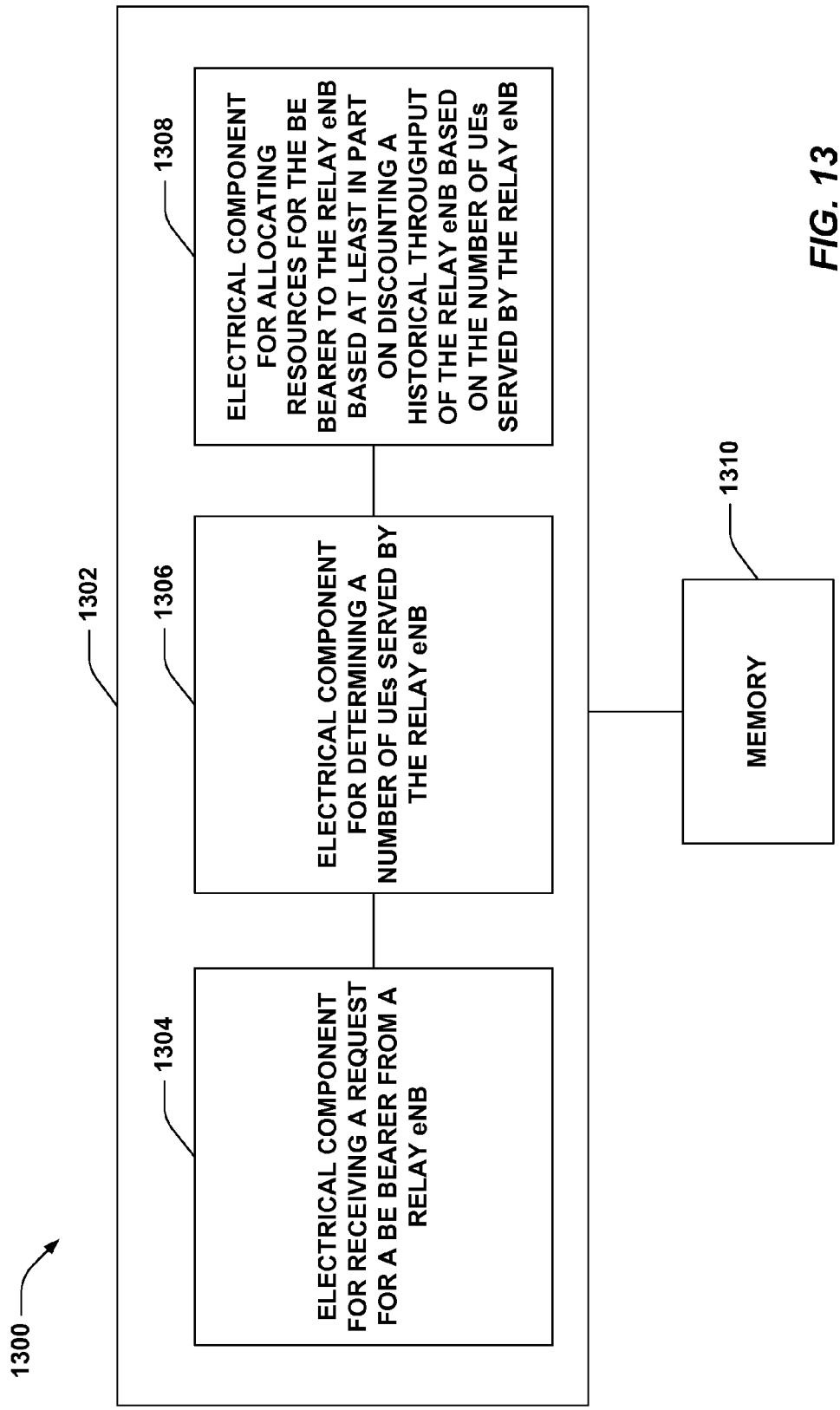
FIG. 13 is a block diagram of an aspect of a system that allocates resources to a relay based on a number of served UEs.

With reference to FIG. 13, illustrated is a system 1300 that allocates BE traffic resources to a relay eNB based on a number of UEs served by the relay eNB. For example, system 1300 can reside at least partially within a donor eNB. It is to be appreciated that system 1300 is represented as including functional blocks, which can be functional blocks that represent functions implemented by a processor, software/firmware, or combinations thereof. System 1300 includes a logical grouping 1302 of components (e.g., electrical components) that can act in conjunction. For instance, logical grouping 1302 can include an electrical component for receiving a request for BE bearer from a relay eNB (1304). Further, logical grouping 1302 can include an electrical component for determining a number of UEs served by the relay eNB (1306). As described, for example, this can include determining the number of UEs based on a QCI in the request received by electrical component 1304, based on an explicit indication received from the relay eNB or an OAM, etc.

In addition, logical grouping 1302 can also include an electrical component for allocating resources for the BE bearer to the relay eNB based at least in part on discounting a historical throughput of the relay eNB based on the number of UEs served by the relay eNB (1308). As described, discounting the historical throughput allows for consideration of the number of served UEs when allocating resources to the relay eNB. For example, electrical component 1304 can include a bearer establishing component 222, as described above. In addition, for example, electrical component 1306, in an aspect, can include a connection count determining component 224, as described above. Moreover, electrical component 1308 can include a BE traffic scheduling component, for example.

Additionally, system 1300 can include a memory 1310 that retains instructions for executing functions associated with the electrical components 1304, 1306, and 1308. While shown as being external to memory 1310, it is to be understood that one or more of the electrical components 1304, 1306, and 1308 can exist within memory 1310. In one example, electrical components 1304, 1306, and 1308 can include at least one processor, or each electrical component 1304, 1306, and 1308 can be a corresponding module of at least one processor. Moreover, in an additional or alternative example, components 1304, 1306, and 1308 can be a computer program product comprising a computer readable medium, where each component 1304, 1306, and 1308 can be corresponding code.

Figure 14:
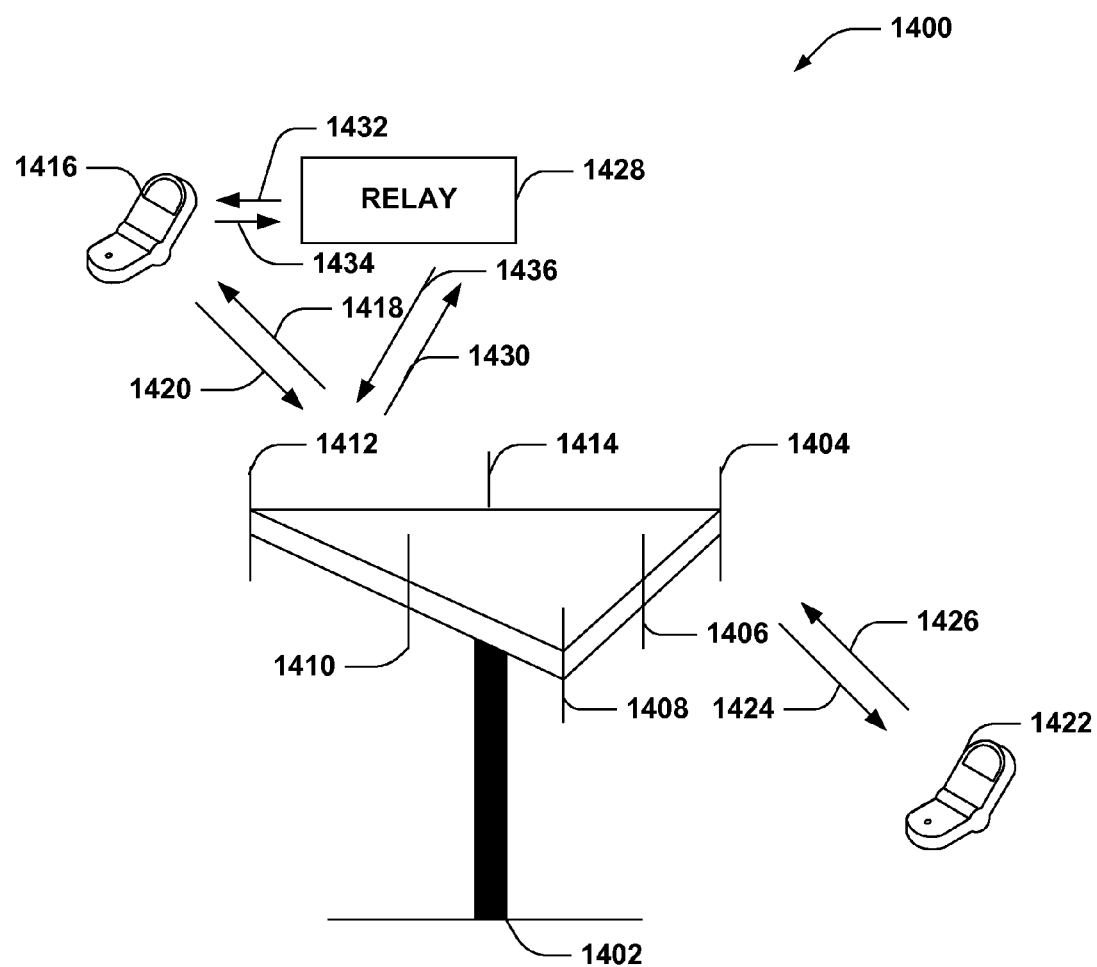
FIG. 14 is a block diagram of an aspect of a wireless communication system in accordance with various aspects set forth herein.

Referring now to FIG. 14, a wireless communication system 1400 is illustrated in accordance with various embodiments presented herein. System 1400 includes a base station 1402 that can include multiple antenna groups. For example, one antenna group can include antennas 1404 and 1406, another group can include antennas 1408 and 1410, and an additional group can include antennas 1412 and 1414. Two antennas are illustrated for each antenna group; however, more or fewer antennas can be utilized for each group. Base station 1402 can additionally include a transmitter chain and a receiver chain, each of which can in turn include a plurality of components associated with signal transmission and reception (e.g., processors, modulators, multiplexers, demodulators, demultiplexers, antennas, etc.), as is appreciated.

Base station 1402 can communicate with one or more mobile devices such as mobile device 1416 and mobile device 1422; however, it is to be appreciated that base station 1402 can communicate with substantially any number of mobile devices similar to mobile devices 1416 and 1422. Mobile devices 1416 and 1422 can be, for example, cellular phones, smart phones, laptops, handheld communication devices, handheld computing devices, satellite radios, positioning systems (e.g., GPS), PDAs, tablets, smart books, netbooks, and/or any other suitable device for communicating over wireless communication system 1400. As depicted, mobile device 1416 is in communication with antennas 1412 and 1414, where antennas 1412 and 1414 transmit information to mobile device 1416 over a forward link 1418 and receive information from mobile device 1416 over a reverse link 1420. Moreover, mobile device 1422 is in communication with antennas 1404 and 1406, where antennas 1404 and 1406 transmit information to mobile device 1422 over a forward link 1424 and receive information from mobile device 1422 over a reverse link 1426. In a frequency division duplex (FDD) system, forward link 1418 can utilize a different frequency band than that used by reverse link 1420, and forward link 1424 can employ a different frequency band than that employed by reverse link 1426, for example. Further, in a time division duplex (TDD) system, forward link 1418 and reverse link 1420 can utilize a common frequency band and forward link 1424 and reverse link 1426 can utilize a common frequency band.

Each group of antennas and/or the area in which they are designated to communicate can be referred to as a sector of base station 1402. For example, antenna groups can be designed to communicate to mobile devices in a sector of the areas covered by base station 1402. In communication over forward links 1418 and 1424, the transmitting antennas of base station 1402 can utilize beamforming to improve signal-to-noise ratio of forward links 1418 and 1424 for mobile devices 1416 and 1422. Also, while base station 1402 utilizes beamforming to transmit to mobile devices 1416 and 1422 scattered randomly through an associated coverage area, mobile devices in neighboring cells can be subject to less interference as compared to a base station transmitting through a single antenna to all its mobile devices. Moreover, mobile devices 1416 and 1422 can communicate directly with one another using a peer-to-peer or ad hoc technology.

According to an example, system 1400 can be a multiple-input multiple-output (MIMO) communication system.

In addition, system 1400 includes a relay 1428 that can facilitate receiving and transmitting signals from base station 1402 to mobile device 1416, and/or vice versa. For example, relay 1428 can receive signals from base station 1402 over forward link 1430, and can transmit the signals to mobile device 1416 over forward link 1432. Thus, for example, mobile device 1416 can receive signals related to base station 1402 over forward links 1418 and/or 1432. In another example, relay 1428 can receive signals from mobile device 1416 over reverse link 1434, and can similarly transmit the signals to base station 1402 over reverse link 1436. Relay 1428 can serve a number of mobile devices, and can indicate the number of mobile devices to base station 1402 in requesting allocation of BE resources for the mobile devices, as described above.

Figure 15:
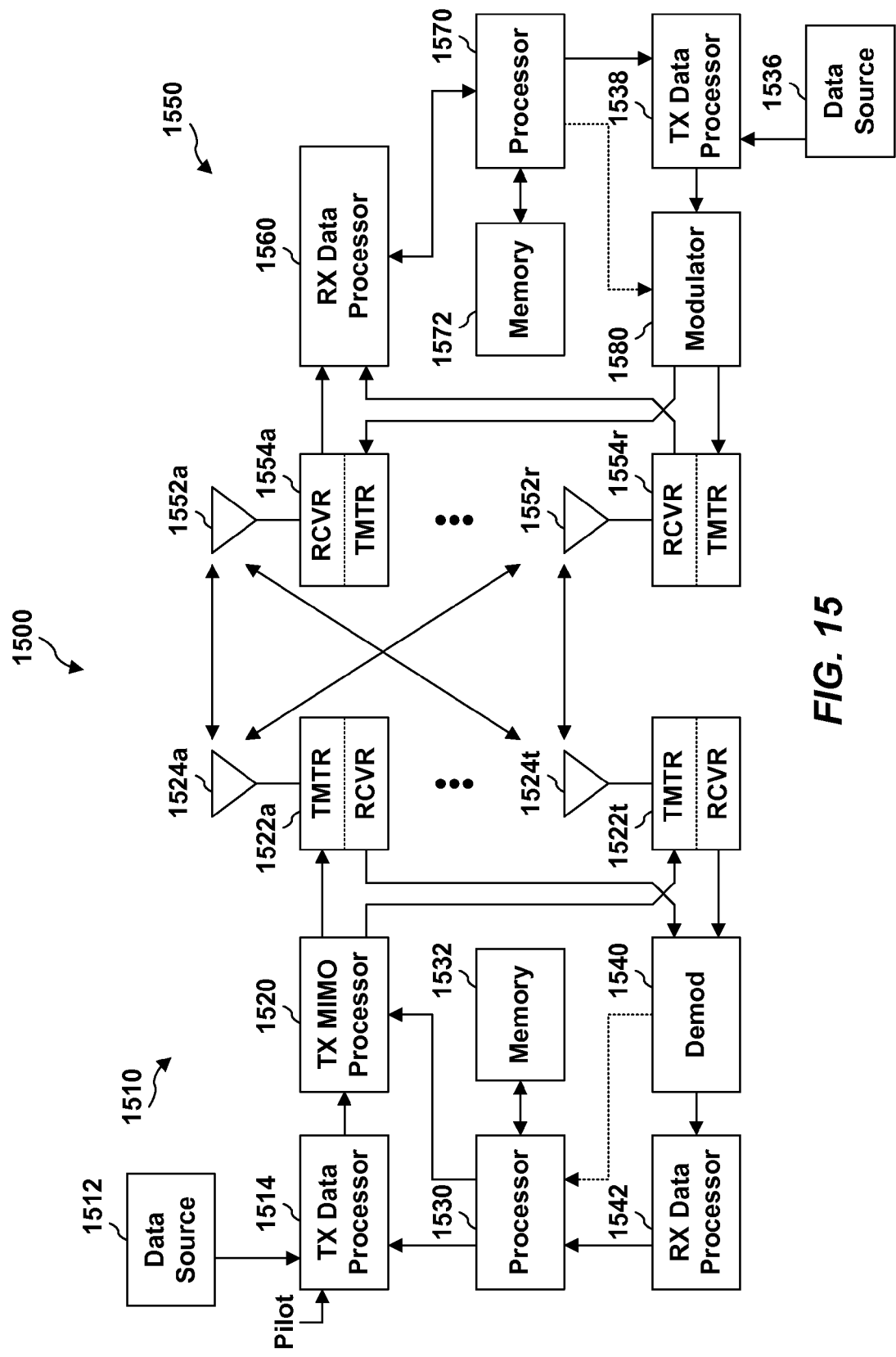
FIG. 15 is a schematic block diagram of an aspect of a wireless network environment that can be employed in conjunction with the various systems and methods described herein.

FIG. 15 shows an example wireless communication system 1500. The wireless communication system 1500 depicts one base station 1510 and one mobile device 1550 for sake of brevity. However, it is to be appreciated that system 1500 can include more than one base station and/or more than one mobile device, wherein additional base stations and/or mobile devices can be substantially similar or different from example base station 1510 and mobile device 1550 described below. In addition, it is to be appreciated that base station 1510 and/or mobile device 1550 can employ the systems (FIGS. 1-4 and 10-14) and/or methods (FIGS. 5-9) described herein to facilitate wireless communication there between. For example, components or functions of the systems and/or methods described herein can be part of a memory 1532 and/or 1572 or processors 1530 and/or 1570 described below, and/or can be executed by processors 1530 and/or 1570 to perform the disclosed functions.

At base station 1510, traffic data for a number of data streams is provided from a data source 1512 to a transmit (TX) data processor 1514. According to an example, each data stream can be transmitted over a respective antenna. TX data processor 1514 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1550 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1530.

The modulation symbols for the data streams can be provided to a TX MIMO processor 1520, which can further process the modulation symbols (e.g., for OFDM). TX MIMO processor 1520 then provides $N_T$ modulation symbol streams to $N_T$ transmitters (TMTR) 1522a through 1522t. In various embodiments, TX MIMO processor 1520 applies beamforming weights to the symbols of the data streams and to the antenna from which the symbol is being transmitted.

Each transmitter 1522 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1522a through 1522t are transmitted from $N_T$ antennas 1524a through 1524t, respectively.

At mobile device 1550, the transmitted modulated signals are received by $N_R$ antennas 1552a through 1552r and the received signal from each antenna 1552 is provided to a respective receiver (RCVR) 1554a through 1554r. Each receiver 1554 conditions (e.g., filters, amplifies, and downconverts) a respective signal, digitizes the conditioned signal to provide samples, and further processes the samples to provide a corresponding "received" symbol stream.

An RX data processor 1560 can receive and process the $N_R$ received symbol streams from $N_R$ receivers 1554 based on a particular receiver processing technique to provide $N_T$ "detected" symbol streams. RX data processor 1560 can demodulate, deinterleave, and decode each detected symbol stream to recover the traffic data for the data stream. The processing by RX data processor 1560 is complementary to that performed by TX MIMO processor 1520 and TX data processor 1514 at base station 1510.

The reverse link message can comprise various types of information regarding the communication link and/or the received data stream. The reverse link message can be processed by a TX data processor 1538, which also receives traffic data for a number of data streams from a data source 1536, modulated by a modulator 1580, conditioned by transmitters 1554a through 1554r, and transmitted back to base station 1510.

At base station 1510, the modulated signals from mobile device 1550 are received by antennas 1524, conditioned by receivers 1522, demodulated by a demodulator 1540, and processed by a RX data processor 1542 to extract the reverse link message transmitted by mobile device 1550. Further, processor 1530 can process the extracted message to determine which precoding matrix to use for determining the beamforming weights.

Processors 1530 and 1570 can direct (e.g., control, coordinate, manage, etc.) operation at base station 1510 and mobile device 1550, respectively. Respective processors 1530 and 1570 can be associated with memory 1532 and 1572 that store program codes and data. In another example, portions of the base station 1510 and portions of device 1550 can be implemented within a relay to provide functionality as described herein. Thus, for example, processors 1530 and 1570 can also request and/or grant bearer establishment for BE traffic based on aspects described herein (e.g., based on indicating a number of devices in a bearer request, indicating a number of devices to an OAM, requesting a GBR bearer to handle BE traffic, and/or the like).

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software/firmware, or combinations thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for requesting best effort resource scheduling from a donor evolved Node B (eNB), comprising:
    transmitting an indication of a number of served UEs, wherein the transmitting the indication includes transmitting the indication to an operation, administration, and management server; and
    transmitting a request to establish a bearer for communicating best effort traffic for the served UEs based at least in part on the number of served UEs,
    wherein the transmitting the indication comprises specifying a quality of service class identifier that corresponds to the number of served UEs in the request to establish the bearer.

2. The method of claim 1, further comprising transmitting a different indication of a maximum throughput over one or more access links with the served UEs to the donor eNB.

3. The method of claim 1, further comprising transmitting a different indication of one or more access link data rates to the donor eNB.

4. An apparatus for requesting best effort resource scheduling from a donor evolved Node B (eNB), comprising:
    at least one processor configured to:
        transmit an indication of a number of served UEs, wherein the at least one processor transmits the indication to an operation, administration, and management server; and
        transmit a request to establish a bearer for communicating best effort traffic for the served UEs based at least in part on the number of served UEs, wherein the at least one processor transmits the indication at least in part by specifying a quality of service class identifier that corresponds to the number of served UEs in the request to establish the bearer; and
    a memory coupled to the at least one processor.

5. The apparatus of claim 4, wherein the at least one processor is further configured to transmit a different indication of a maximum throughput over one or more access links with the served UEs to the donor eNB.

6. The apparatus of claim 4, wherein the at least one processor is further configured to transmit a different indication of one or more access link data rates to the donor eNB.

7. An apparatus for requesting best effort resource scheduling from a donor evolved Node B (eNB), comprising:
    means for transmitting an indication of a number of served UEs, wherein the means for transmitting the indication transmits the indication to an operation, administration, and management server; and
    means for transmitting a request to establish a bearer for communicating best effort traffic for the served UEs based at least in part on the number of served UEs,
    wherein the means for transmitting the indication specifies a quality of service class identifier that corresponds to the number of served UEs in the request to establish the bearer.

8. The apparatus of claim 7, further comprising means for transmitting a different indication of a maximum throughput over one or more access links with the served UEs to the donor eNB.

9. The apparatus of claim 7, further comprising means for transmitting a different indication of one or more access link data rates to the donor eNB.

10. A computer program product for requesting best effort resource scheduling from a donor evolved Node B (eNB), comprising:
    a non-transitory computer-readable medium, comprising:
        code for causing at least one computer to transmit an indication of a number of served UEs, wherein the code for causing the at least one computer to transmit the indication transmits the indication to an operation, administration, and management server; and
        code for causing the at least one computer to transmit a request to establish a bearer for communicating best effort traffic for the served UEs based at least in part on the number of served UEs,
        wherein the code for causing the at least one computer to transmit the indication specifies a quality of service class identifier that corresponds to the number of served UEs in the request to establish the bearer.

11. The computer program product of claim 10, wherein the computer-readable medium further comprises code for causing the at least one computer to transmit a different indication of a maximum throughput over one or more access links with the served UEs to the donor eNB.

12. The computer program product of claim 10, wherein the computer-readable medium further comprises code for causing the at least one computer to transmit a different indication of one or more access link data rates to the donor eNB.

13. A method for requesting best effort resource scheduling from a donor evolved Node B (eNB), comprising:
determining one or more parameters related to best effort traffic with a donor eNB; and
requesting a guaranteed bit rate (GBR) bearer from the donor eNB, through an operation, administration, and management server, specifying a data rate based on the one or more parameters and a number of served UEs,
wherein the determining the one or more parameters comprises determining a best effort data rate related to the donor eNB, and the specifying the data rate comprises specifying the best effort data rate multiplied by the number of served UEs.

14. The method of claim 13, further comprising:
probing a best effort bearer with the donor eNB following establishment of the GBR bearer with the donor eNB to determine an updated best effort data rate related to the donor eNB; and
requesting modification of the GBR bearer specifying the data rate as the updated best effort data rate multiplied by the number of served UEs.

15. The method of claim 13, further comprising:
establishing the GBR bearer with the donor eNB; and
mapping the served UEs to resources of the GBR bearer for communicating best effort traffic.

16. An apparatus for requesting best effort resource scheduling from a donor evolved Node B (eNB), comprising:
at least one processor configured to:
determine one or more parameters related to best effort traffic with a donor eNB; and
request a guaranteed bit rate (GBR) bearer from the donor eNB, through an operation, administration, and management server, specifying a data rate based on the one or more parameters and a number of served UEs,
wherein the determining the one or more parameters comprises determining a best effort data rate related to the donor eNB, and the specifying the data rate comprises specifying the best effort data rate multiplied by the number of served UEs; and
a memory coupled to the at least one processor.

17. The apparatus of claim 16, wherein the at least one processor is further configured to:
probe a best effort bearer with the donor eNB following establishment of the GBR bearer with the donor eNB to determine an updated best effort data rate related to the donor eNB; and
request modification of the GBR bearer specifying the data rate as the updated best effort data rate multiplied by the number of served UEs.

18. The apparatus of claim 16, wherein the at least one processor is further configured to:
establish the GBR bearer with the donor eNB; and
map the served UEs to resources of the GBR bearer for communicating best effort traffic.

19. An apparatus for requesting best effort resource scheduling from a donor evolved Node B (eNB), comprising:
means for determining one or more parameters related to best effort traffic with a donor eNB; and
means for requesting a guaranteed bit rate (GBR) bearer from the donor eNB, through an operation, administration, and management server, specifying a data rate based on the one or more parameters and a number of served UEs,
wherein the means for determining determines the one or more parameters as a best effort data rate related to the donor eNB, and the means for requesting specifies the data rate as the best effort data rate multiplied by the number of served UEs.

20. The apparatus of claim 19, further comprising means for mapping the served UEs to resources of the GBR bearer for communicating best effort traffic, wherein the means for requesting establishes the GBR bearer with the donor eNB.

21. The apparatus of claim 19, wherein the means for determining probes a best effort bearer with the donor eNB following establishment of the GBR bearer with the donor eNB to determine an updated best effort data rate related to the donor eNB, and the means for requesting requests modification of the GBR bearer specifying the data rate as the updated best effort data rate multiplied by the number of served UEs.

22. A computer program product for requesting best effort resource scheduling from a donor evolved Node B (eNB), comprising:
a non-transitory computer-readable medium, comprising:
code for causing at least one computer to determine one or more parameters related to best effort traffic with a donor eNB; and
code for causing the at least one computer to request a guaranteed bit rate (GBR) bearer from the donor eNB, through an operation, administration, and management server, specifying a data rate based on the one or more parameters and a number of served UEs,
wherein the code for causing the at least one computer to determine determines the one or more parameters as a best effort data rate related to the donor eNB, and the code for causing the at least one computer to request specifies the data rate as the best effort data rate multiplied by the number of served UEs.

23. The computer program product of claim 22, wherein the code for causing the at least one computer to determine probes a best effort bearer with the donor eNB following establishment of the GBR bearer with the donor eNB to determine an updated best effort data rate related to the donor eNB, and the code for causing the at least one computer to request requests modification of the GBR bearer specifying the data rate as the updated best effort data rate multiplied by the number of served UEs.

24. The computer program product of claim 22, wherein the computer-readable medium further comprises code for causing the at least one computer to map the served UEs to resources of the GBR bearer for communicating best effort traffic, wherein the code for causing the at least one computer to request establishes the GBR bearer with the donor eNB.

25. A method for allocating best effort resources for one or more relay evolved Node Bs (eNB), comprising:
receiving a request for a best effort bearer from a relay eNB, wherein the request is received through an operation, administration, and management server;
determining a number of UEs served by the relay eNB, wherein the determining the number of UEs is based at least in part on obtaining a quality of service class identifier specified in the request;
discounting a historical throughput of the relay eNB by the number of UEs; and
allocating resources for the best effort bearer to the relay eNB based at least in part on the discounted historical throughput.

26. The method of claim 25, wherein the determining the number of UEs is based at least in part on requesting the number of UEs from an operation, administration, and management server.

27. The method of claim 25, further comprising inspecting packets received from or transmitted to the relay eNB to determine a number of different identifiers in the packets, wherein the determining the number of UEs is based at least in part on determining the number of different identifiers.

28. The method of claim 25, further comprising receiving a maximum throughput from the relay eNB, wherein the allocating the resources is further based at least in part on the maximum throughput.

29. The method of claim 25, further comprising receiving one or more access link data rates from the relay eNB, wherein the allocating the resources is further based at least in part on the one or more access link data rates.

30. An apparatus for allocating best effort resources for one or more relay evolved Node Bs (eNB), comprising:
at least one processor configured to:
receive a request for a best effort bearer from a relay eNB, wherein the request is received through an operation, administration, and management server;
determine a number of UEs served by the relay eNB, wherein the at least one processor determines the number of UEs based at least in part on determining a quality of service class identifier specified in the request;
discount a historical throughput of the relay eNB by the number of UEs; and
allocate resource for the best effort bearer to the relay eNB based at least in part on the discounted historical throughput; and
a memory coupled to the at least one processor.

31. The apparatus of claim 30, wherein the at least one processor determines the number of UEs based at least in part on requesting the number of UEs from an operation, administration, and management server.

32. The apparatus of claim 30, wherein the at least one processor is further configured to inspect packets received from or transmitted to the relay eNB to determine a number of different identifiers in the packets, and wherein the at least one processor determines the number of UEs based at least in part on the number of different identifiers.

33. The apparatus of claim 30, wherein the at least one processor is further configured to receive a maximum throughput from the relay eNB, and wherein the at least one processor allocates the resources further based at least in part on the maximum throughput.

34. The apparatus of claim 30, wherein the at least one processor is further configured to receive one or more access link data rates from the relay eNB, and wherein the at least one processor allocates the resources further based at least in part on the one or more access link data rates.

35. An apparatus for allocating best effort resources for one or more relay evolved Node Bs (eNB), comprising:
means for receiving a request for a best effort bearer from a relay eNB, wherein the request is received through an operation, administration, and management server;
means for determining a number of UEs served by the relay eNB, wherein the means for determining determines the number of UEs based at least in part on determining a quality of service class identifier specified in the request; and
means for allocating resources for the best effort bearer to the relay eNB based at least in part on discounting a historical throughput of the relay eNB based on the number of UEs served by the relay eNB.

36. The apparatus of claim 35, wherein the means for determining determines the number of UEs based at least in part on requesting the number of UEs from an operation, administration, and management server.

37. The apparatus of claim 35, wherein the means for determining inspects packets received from or transmitted to the relay eNB to determine a number of different identifiers in the packets, and determines the number of UEs based at least in part on the number of different identifiers.

38. The apparatus of claim 35, further comprising means for receiving a maximum throughput from the relay eNB, wherein the means for allocating allocates the resources further based at least in part on the maximum throughput.

39. The apparatus of claim 35, further comprising means for receiving one or more access link data rates from the relay eNB, wherein the means for allocating allocates the resources further based at least in part on the one or more access link data rates.

40. A computer program product for allocating best effort resources for one or more relay evolved Node Bs (eNB), comprising:
a non-transitory computer-readable medium, comprising:
code for causing at least one computer to receive a request for a best effort bearer from a relay eNB, wherein the request is received through an operation, administration, and management server;
code for causing the at least one computer to determine a number of UEs served by the relay eNB, wherein the code for causing the at least one computer to determine determines the number of UEs based at least in part on determining a quality of service class identifier specified in the request;
code for causing the at least one computer to discount a historical throughput of the relay eNB by the number of UEs; and
code for causing the at least one computer to allocate the best effort bearer to the relay eNB based at least in part on the discounted historical throughput.

41. The computer program product of claim 40, wherein the code for causing the at least one computer to determine determines the number of UEs based at least in part on requesting the number of UEs from an operation, administration, and management server.

42. The computer program product of claim 40, wherein the computer-readable medium further comprises code for causing the at least one computer to inspect packets received from or transmitted to the relay eNB to determine a number of different identifiers in the packets, and wherein the code for causing the at least one computer to determine determines the number of UEs based at least in part on the number of different identifiers.

43. The computer program product of claim 40, wherein the computer-readable medium further comprises code for causing the at least one computer to receive a maximum throughput from the relay eNB, and wherein the code for causing the at least one computer to allocate allocates the resources further based at least in part on the maximum throughput.

44. The computer program product of claim 40, wherein the computer-readable medium further comprises code for causing the at least one computer to receive one or more access link data rates from the relay eNB, and wherein the code for causing the at least one computer to allocate allocates the resources further based at least in part on the one or more access link data rates.

\* \* \* \* \*